(12) United States Patent
Kabulepa et al.

(10) Patent No.: US 8,935,569 B2
(45) Date of Patent: Jan. 13, 2015

(54) CONTROL COMPUTER SYSTEM, METHOD FOR CONTROLLING A CONTROL COMPUTER SYSTEM, AND USE OF A CONTROL COMPUTER SYSTEM

(75) Inventors: Lukusa Didier Kabulepa, Erzhausen (DE); Thorsten Ehrenberg, Bad Nauheim (DE); Daniel Baumeister, Aschaffenburg (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 229 days.

(21) Appl. No.: 13/636,091

(22) PCT Filed: Mar. 18, 2011

(86) PCT No.: PCT/EP2011/054144
§ 371 (c)(1),
(2), (4) Date: Oct. 4, 2012

(87) PCT Pub. No.: WO2011/117156
PCT Pub. Date: Sep. 29, 2011

(65) Prior Publication Data
US 2013/0024721 A1    Jan. 24, 2013

(30) Foreign Application Priority Data

Mar. 23, 2010  (DE) .......................... 10 2010 003 161
Oct. 1, 2010   (DE) .......................... 10 2010 041 890

(51) Int. Cl.
*G06F 11/00*    (2006.01)
*G06F 11/16*    (2006.01)
*G06F 11/20*    (2006.01)

(52) U.S. Cl.
CPC .......... *G06F 11/1641* (2013.01); *G06F 11/165* (2013.01); *G06F 11/203* (2013.01); *G06F 11/2035* (2013.01); *G06F 11/2043* (2013.01); *G06F 11/1645* (2013.01)
USPC ............................................... 714/12; 714/11

(58) Field of Classification Search
USPC ....................................................... 714/11, 12
See application file for complete search history.

(56) References Cited

U.S. PATENT DOCUMENTS

| 3,444,528 A | 5/1969 | Lovell et al. |
| 3,864,670 A | 2/1975 | Inoue |

(Continued)

FOREIGN PATENT DOCUMENTS

| DE | 10 2009 000 045 A1 | 7/2010 |
| EP | 0 687 976 A1 | 6/1995 |

(Continued)

OTHER PUBLICATIONS

German Examination Report—Oct. 17, 2010.

(Continued)

*Primary Examiner* — Joshua P Lottich
(74) *Attorney, Agent, or Firm* — Brinks Gilson & Lione

(57) ABSTRACT

A control computer system comprising at least two modules (1, 2, 1001, 1002, 1003, 1004, 1021, 1071) which are designed to be redundant with respect to one another. The control computer system having at least one comparison unit (20, 21, 91, 92, 1011, 1012) for monitoring the synchronization state of the at least two redundant modules (1, 2, 1001, 1002, 1003, 1004, 1021, 1071) and for detecting a synchronization error at least one peripheral unit (95, 96, 1022, 1030, 1031, . . . , 1038). At least one switching matrix (21, 1013, 1063) which is set up to allow or block access to the at least two redundant modules or access to the peripheral unit (95, 96, 1022, 1030, 1031, . . . , 1038) by the at least two redundant modules, and an error-handling unit (44, 1080) which is set up to receive signals from the at least one comparison unit (20, 21, 91, 92, 1011, 1012) and to drive the at least one switching matrix (1013, 1063) in order to completely or selectively prevent access to the at least two redundant modules or access to the peripheral unit by the at least two redundant modules.

31 Claims, 24 Drawing Sheets

(56) References Cited

U.S. PATENT DOCUMENTS

| | | | | |
|---|---|---|---|---|
| 5,138,708 | A | * | 8/1992 | Vosbury ............... 714/11 |
| 5,226,152 | A | * | 7/1993 | Klug et al. ............ 714/12 |
| 5,249,188 | A | | 9/1993 | McDonald |
| 5,687,310 | A | * | 11/1997 | Rotker et al. .......... 714/11 |
| 5,751,955 | A | * | 5/1998 | Sonnier et al. ......... 714/12 |
| 5,790,776 | A | * | 8/1998 | Sonnier et al. ......... 714/10 |
| 5,838,894 | A | * | 11/1998 | Horst ................... 714/11 |
| 5,901,281 | A | | 5/1999 | Miyao et al. |
| 5,915,082 | A | | 6/1999 | Marshall et al. |
| 6,065,135 | A | | 5/2000 | Marshall et al. |
| 6,393,582 | B1 | * | 5/2002 | Klecka et al. .......... 714/11 |
| 7,366,948 | B2 | | 4/2008 | Michaelis et al. |
| 2006/0107106 | A1 | | 5/2006 | Michaelis et al. |

FOREIGN PATENT DOCUMENTS

| | | |
|---|---|---|
| EP | 1 380 953 A1 | 1/2004 |
| EP | 1 456 720 B1 | 9/2004 |
| WO | WO 99/30235 | 6/1999 |
| WO | WO 99/66406 | 12/1999 |

OTHER PUBLICATIONS

PCT International Search Report—Mar. 18, 2011.

Chinese Patent Application No. 2011800155628 Examination Report.

Survey Article—Fault-Tolerance in Process Control: Possibilities, Limitations and Trends—R. Cuyvers et al.—Journal A: vol. 31, N° 4, 1990.

* cited by examiner

CONTROL COMPUTER SYSTEM, METHOD FOR CONTROLLING A CONTROL COMPUTER SYSTEM, AND USE OF A CONTROL COMPUTER SYSTEM

CROSS-REFERENCE TO RELATED APPLICATIONS

This application claims priority to German Patent Application Numbers 1020 1000161.5, filed Mar. 23, 2010, 1020100041890.0, filed Oct. 1, 2010, and PCT/EP2011/054144, filed Mar. 18, 2011.

FIELD OF THE INVENTION

The following invention relates to a redundant electronic processor controller and to a control method, in particular to a redundant two-processor controller and a multicore redundant control computer system.

BACKGROUND OF THE INVENTION

It is known practice to have two processors execute the same instructions in a lockstep mode and to determine whether an error has occurred by comparing the output data. In this case, the two processors may be operated in clock synchronism or with a certain temporal offset (which is accordingly compensated for during comparison). Both permanent errors, which are caused, for example, by a defect introduced during production, and transient errors, which are caused, for example, by temporary electromagnetic interference, may occur in this case. Program execution is interrupted and, in the simplest case, the computer system is deactivated if a lockstep error occurs, in the case of which the output data from the two processors therefore differ from one another.

However, providing error tolerance, according to which the computer system thus continues to execute the desired program if an error occurs, is a particular challenge for processors with double redundancy. Attempts have been made to assist error tolerance capability in safety platforms with just two redundant processors. U.S. Pat. No. 5,915,082 B2 discloses a system architecture in which internal buses are provided with parity bits which are compared. After a parity error has been detected on one side, the associated processor is disconnected, with the result that it no longer has any influence on the system. The system is switched off after every lockstep error which occurs without a parity error. This procedure which is based on parity checking does not provide sufficient coverage of cases in which the availability of a redundant system is very desirable even after the occurrence of a lockstep error. The parity check can lead, for example, to an incorrect decision if the two internal redundant units simultaneously show different multi-bit errors.

Further known error-tolerant system architectures comprise at least three processor cores with a shared or jointly used memory. In this case, the lockstep mode of the processors is always checked by monitoring bus signals. The lockstep mode is also referred to below as synchronous execution of a program or program parts by the processors.

If the active processor fails, the ownership of the memory area and components which are driven by the active processor via input/output channels passes over to another processor. In the lockstep error state (synchronization error) which follows a lockstep error, data access and control processes are removed from the active processor and maintained by another processor.

The classic minimum configuration for an error-tolerant system, which comprises triple redundancy (TMR: Triple modular redundancy) of processors and a jointly used memory, is still an expensive solution for many safety architectures whose safety concept is based on the use of two redundant processors running in lockstep or synchronously. However, error tolerance is a particular challenge for processors with double redundancy.

U.S. Pat. No. 7,366,948 B2 and US Patent Application Publication 2006/0107106 describe a method for assisting the availability in a system composed of a plurality of processor pairs running in the lockstep mode. Two redundant processors are combined in each pair and their outputs are continuously compared. If an error occurs in one processor pair, another processor pair will assume the driving of the system as a boot processor pair. In the meantime, the processor pair with an error will attempt to recover the synchronization and make itself available as a standby processor pair. This ensures a high level of availability of the system. However, this method is too expensive for many embedded systems since one processor pair is not used when there are no errors and the described method thus provides a poor cost/performance ratio. Four processors which are divided into two pairs and whose output signals are compared in pairs must always be used for a single task. If a lockstep error (LOL: loss of lockstep) or another processor-internal error is detected in a processor pair, the operating system changes the defective processor pair to the quiescent state and activates another processor pair.

EP 1 380 953 B1 defines an error-tolerant computer system with lockstep synchronism, said system containing a multiplicity of computation modules with a processor and a memory, and describes a method for resynchronizing said system. Since each computation module synchronously processes the same instruction string, this computer system is not very efficient.

EP 1 456 720 B1 discloses a computer group for safety-critical applications in motor vehicles comprising two or more control computer systems each comprising two control computers which operate in clock synchronism and have partially or fully redundant peripheral elements and partially or fully redundant memory elements integrated on a chip. The control computers of a control computer system which operate in clock synchronism are connected to an arbitration unit which monitors them for errors and can couple a communication controller assigned to the control computer system to a vehicle data bus or can decouple said controller. If one of the control computers malfunctions, the corresponding control computer system is partially or completely deactivated.

DE 10 2009 000 045 A1 discloses an apparatus for operating a control device which has a computer system comprising two pairs of two execution units each and is used, in particular, in a motor vehicle. The execution units in each pair execute the same program, and the output signals from each execution unit are compared with one another by a respective comparison unit and an error signal is output if a discrepancy occurs. If the error signal occurs for a first pair of execution units, this pair is switched off and the computer system continues to be operated using the second pair of execution units, an advance warning signal being output to the driver.

Systems and methods in accordance with the previously mentioned documents have the disadvantage that a high degree of redundancy must be made available since, when there are no errors, at least one processor pair is inactive or executes the same program as the active processor pair which drives peripheral units. Therefore, each individual processor must provide the entire computation power required, as a result of which the known computer systems do not operate in a very efficient manner. This is undesirable from the point of view of costs, in particular in the case of systems produced in large quantities.

The method described in U.S. Pat. No. 7,366,948 B2 is a very expensive solution for embedded systems. There is also the fact that other components, apart from the processor cores, cannot always be implemented in a redundant manner. Financial reasons typically play an important role when designing safety architectures for different safety-relevant systems, for example brake applications in the automotive sector. Program memories, for example flash memories, are not redundant, but rather are used by all existing processors. Conventional methods do not consider this boundary condition of non-redundant components in the approach to ensuring availability in safety architectures based on redundant processors. Another problem as regards ensuring the availability of processors in safety architectures is that a processor which has previously failed can be started up again only after a safety check has been successfully concluded.

Against this background, there is a need for a safety architecture which has just two redundant processors and which enables a high level of availability of the system. There is also a need for a safety architecture which has three or more processors, for example two processors with two cores each, and which enables a high level of availability of the system.

SUMMARY OF THE INVENTION

According to one aspect, the object of the present invention is to provide a control computer system which is simultaneously error-tolerant and efficient.

According to one embodiment of the invention, a safety architecture based on pairs of redundant processor cores is intended to be configured in such a manner that the existing safety level is retained and a high level of availability of the system is enabled. In addition, the processors are intended to deliver a high level of performance in the normal (or error-free) mode. After an error has been detected, the availability of the system is intended to be maintained taking into account a safe connection of non-redundant components.

Against this background, a control computer system according to this invention is provided. A two-processor control device is also provided. A method for controlling a control computer system according to this invention is also provided. A use of a control computer system according to this invention is also provided.

One embodiment of this invention provides a control computer system. The control computer system includes at least two modules which are designed to be redundant with respect to one another; at least one comparison unit for monitoring the synchronization state of the at least two redundant modules and for detecting a synchronization error; at least one peripheral unit; at least one switching matrix which is set up to allow or block access to the at least two redundant modules or access to the peripheral unit by the at least two redundant modules. The control computer system also includes an error-handling unit which is set up to receive signals from the at least one comparison unit and to drive the at least one switching matrix in order to completely or selectively prevent access to the at least two redundant modules or access to the peripheral unit by the at least two redundant modules.

In the event of an error, access to the defective module or access to peripheral units by the defective module is precluded by the switching matrix which is driven by the error-handling unit. According to one embodiment, the error-handling unit initiates and monitors one or more tests for checking the redundant modules for errors and, when an error is detected, controls the switching matrix in such a manner that the defective module, in particular, is no longer taken into account for safety-relevant applications.

According to one embodiment of this invention, the at least two redundant modules are at least two processor units for synchronously executing a control program or other units, for example redundantly designed memory modules.

According to one embodiment of this invention, the control computer system comprises at least four processor units, wherein the processor units may be single processors, processors of processor pairs or cores of dual-core or multicore processors.

According to one embodiment of this invention, a safety architecture based on pairs of redundant processor cores is modified in such a manner that the defective processor pair, an individual defective processor core of a processor having at least two processor cores and/or the defective component is/are excluded from driving existing actuators since an independent module blocks any access to safety-relevant peripheral units by the defective processor pair after an error has been detected. The error-free processor pair(s) or processor core(s) or the defective component will leave the normal mode in order to ensure an emergency mode. In the emergency mode, each error-free processor pair/processor core assumes some tasks of the failed processor pair/processor core if necessary and also carries out a subset of its original tasks. For each processor pair/processor core, the software programs running on the latter are divided into two groups. One group of software programs is intended to be able to run both in the normal mode and in the emergency mode, while software programs in the other group are switched off in the emergency mode. An error-free processor pair/processor core is thus able to assume additional tasks in the emergency mode. Each software component is classified as suitable or unsuitable and/or dispensable or indispensable for the emergency mode. If a processor pair/processor core is defective, the tasks necessary for the emergency mode are assumed by an error-free processor pair/processor core.

In one preferred embodiment of the invention, the aim is to restore the normal mode of the safety architecture, which is why the failed processor pair/processor core is subjected to a number of checking tests. While these tests are being carried out, this processor pair/processor core will store various results which are intended to correspond to previously known results of algorithms which have been carried out. In this case, an independent hardware module checks the correctness of the results. After the restoration conditions have been successfully tested, all processor pairs/processor cores return to the normal mode.

As a result of the fact that a control computer system according to the invention can prevent a defective processor pair/processor core from accessing peripherals, damage caused by a defective processor pair/processor core driving an actuator is prevented.

When there are no errors, the individual processor pairs or the processor core(s) of the control computer system according to the invention can execute different programs, as a result of which a high computing power is available. If an error occurs, the error-free processor pair or the error-free processor core(s) assume(s) the critical functions of the defective processor pair/processor core, whereas some non-critical functions are no longer available. This emergency mode enables a high level of error tolerance of the control computer system according to the invention.

The invention also relates to the use of a control computer system according to the invention in a motor vehicle, in particular in order to control or regulate a brake system.

According to one or more embodiments of this invention, a control computer system, for example in the form of a redundant two-processor control device, comprises a first processor (or first core of a processor) and a second processor (or second core of a processor) for synchronously executing a control program, at least one first multiplexer for optionally connecting at least one first peripheral unit to be driven to one of the two processors, and at least one first comparison unit (comparator) for monitoring the synchronization state of the two processors and for detecting a synchronization error. The control computer system (the control device) also comprises a restoration control unit (which is also referred to as SAM modules in some embodiments) which is set up to monitor the execution of at least one test program by the two processors after a synchronization error has occurred and to assess the test results and is also set up to configure at least the first multiplexer.

The comparison unit monitors the synchronous operation, that is to say the lockstep, of the processors. This may be effected by comparing the execution of the control program on a "line-by-line" basis, in which case the same results must be present at the same times. If this is not the case, there is a lockstep error, that is to say the processors are no longer operating in synchronism.

The synchronous execution of the control program is an important feature of redundant systems since it can be used to check whether the currently active processor is operating without errors, in which case it is assumed that the simultaneous occurrence of the same error in both processors is statistically very unlikely. However, if a synchronization error occurs, it is initially unclear whether the error has occurred in the active or passive processor (core). In this case, an active processor (core) is intended to be understood as meaning the processor which actually drives the peripheral unit. The passive processor (core) is that processor which only concomitantly runs in synchronism, that is to say receives the same data and executes the same program steps as the active processor.

If a synchronization error occurs, it is thus no longer ensured that control is carried out correctly, that is to say there is a risk, in particular in safety-relevant systems as are used, for example, in the automotive sector or else in other sectors. The control system, for example the control systems shown in FIGS. 7 and 8 of the appended drawings must usually be completely switched off.

The solution proposed here provides a restoration control unit (independent hardware module) which subjects the two processors (cores) to a test when a synchronization error occurs in order to determine which of the two processors is defective. After the test has been carried out and the test results have been assessed, the restoration control unit decides the subsequent procedure.

If both processors have passed the test, it is assumed that both processors are error-free. In this case, the synchronous execution of the control program is continued.

This solution has the decisive advantage that the driving of the peripheral unit can be continued whilst retaining the high safety level since the two processors have been subjected to a test for absence of errors. This is a decisive advantage over other solutions in which complete switching-off is, in principle, carried out after a synchronization error (lockstep error) has occurred and the system can be reset again only externally. In this case, it must be borne in mind that the mere resetting of a system is often not a satisfactory solution for safety-relevant applications since no error assessment is carried out, that is to say what caused the synchronization error remains unidentified. The solution described here therefore provides a way of dealing with synchronization errors and makes it possible to recover the synchronization of two redundant systems after a lockstep error.

If, in contrast, a processor (core) was deemed to be defective, the control device (control computer system) is reconfigured by the restoration control unit (SAM module), to be precise in such a manner that the outputs of the defective processor are ignored from then on and it is ensured that the peripheral unit can then only be driven by the error-free processor but not by the defective processor. This is typically effected by reconfiguring the first multiplexer, with the result that a data flow is only possible between the peripheral unit and the error-free processor. In addition, reconfiguration results in the comparison unit no longer carrying out any monitoring.

This solution has the decisive advantage that the driving of the peripheral unit can be continued even if this is now effected without redundancy on the processor side. This is a considerable advantage over known solutions in which the control was completely switched off when a synchronization error (lockstep errors) occurred. The proposed solution increases the availability of the system, which is particularly important in critical applications so that control of the system can continue to be maintained. However, the control device can emit an error signal in order to indicate the "single-processor operation" which is now present, with the result that maintenance can be carried out.

The redundant control apparatus which is proposed here and has means for controlling a synchronization error can be used in any desired safety-relevant systems. Braking applications in the automotive sector are one example. In this case, the control apparatus based on only two redundant processors is configured in such a manner that it retains the existing safety level and allows a high level of availability of the system.

The peripheral unit to be driven may, in principle, be understood as meaning any unit which is accessed by the respective processor. Examples are memories, actuators, input/output units and sensors.

According to one or more embodiments of this invention, the restoration control unit is set up to assign the synchronization error to an error type and to select a test program on the basis of the error type. The error which has occurred is analyzed in order to find out where the error may have occurred or which of the components caused the error. A suitable test program is then selected on this basis, in which case the test programs and the expected test results are stored in advance, for example in the restoration control unit. If the error, that is to say the difference between the two processor outputs, is manifested in a different memory address, it is possible to select a test program which can be used to detect memory errors, for example. This approach improves error localization.

According to one or more embodiments of this invention, the restoration control unit (SAM module) is set up to configure the first multiplexer on the basis of the test result. The multiplexer, and generally the control device, is thus configured on the basis of the test result. It is possible for the function of the multiplexer to be assumed by a bus matrix.

According to one or more embodiments of this invention, the control device also has at least one second multiplexer for optionally connecting at least one second peripheral unit to be driven to one of the two processors, wherein the second multiplexer can be configured by the restoration control unit.

The control apparatus thus also makes it possible to optionally drive a plurality of peripheral units while taking into account the safety aspects.

According to one or more embodiments of this invention, the control device also has at least one second comparison unit (comparator) for monitoring the synchronization state of the two processors and for detecting a synchronization error. This enables mutual monitoring and thus increases the reliability of the system.

According to one or more embodiments of this invention, the control device has a first bus matrix which connects the first processor to the first multiplexer, and a second bus matrix which connects the second processor to the second multiplexer.

According to one or more embodiments of this invention, the first peripheral unit is a common unit which can be optionally driven by one of the two processors. According to one embodiment, the control apparatus also has at least two further peripheral units, wherein one of the two peripheral units is assigned only to the first processor and the other of the two peripheral units is assigned only to the second processor as a private peripheral unit which can be accessed only by the respectively assigned processor. In this case, a common peripheral unit or component is understood as meaning a unit which is driven in a redundant manner, that is to say the driving is optionally effected by one of the two processors, in which case the other processor is used for comparison. In contrast, a private unit is driven only by one of the two processors in each case. The respective other processor does not have access to this unit, not even via the multiplexer(s). The solution presented here allows the synchronization between two redundant processors to be recovered, even while taking into account non-redundant components which are typically implemented in various embedded systems for financial reasons.

According to one or more embodiments of this invention, the two further peripheral units are redundant units, that is to say they are physically identical and are used to execute the same function.

According to one or more embodiments of this invention, the first and/or second comparison unit is/are set up to generate a synchronization error signal when a synchronization error occurs. The synchronization error signal may be an interrupt, for example.

One embodiment of this invention provides a control computer system, for example in the form of a redundant two-processor control device. The control computer system comprises: a first processor and a second processor for synchronously executing a control program; at least one first multiplexer for optionally connecting a common first peripheral unit to one of the two processors; at least two further peripheral units, wherein one of the two peripheral units is assigned only to the first processor and the other of the two peripheral units is assigned only to the second processor as a private peripheral unit which can be accessed only by the respectively assigned processor; at least one first comparison unit for monitoring the synchronization state of the two processors and for detecting a synchronization error when the two processors are desynchronized; a restoration control unit which is set up to monitor the execution of at least one test program by the two processors after a synchronization error has occurred and to assess the test results and is set up to configure the first multiplexer on the basis of the test result.

According to one embodiment of this invention, the control computer system also comprises: a first bus matrix which connects the first processor to the first multiplexer; a second bus matrix which connects the second processor to the first multiplexer.

One embodiment provides a control computer system, for example in the form of a redundant two-processor control device, including: a first processor and a second processor for synchronously executing a control program; at least one first and one second peripheral unit; at least one first multiplexer for optionally connecting a first peripheral unit to one of the two processors; at least one second multiplexer for optionally connecting a second peripheral unit to one of the two processors; at least one first and one second comparison unit for respectively monitoring the synchronization state of the two processors and for detecting a synchronization error; a restoration control unit which is set up to monitor the execution of at least one test program by the two processors after a synchronization error has occurred and to assess the test results and is set up to configure the first and second multiplexers on the basis of the test results.

According to one embodiment of this invention, the control computer system, for example in the form of a redundant two-processor control device, also includes: a first bus matrix which connects the first processor to the first multiplexer; a second bus matrix which connects the second processor to the second multiplexer.

One or more embodiments of this invention provide a control method. The control method includes the synchronous execution of a control program by a first processor and a second processor, which are connected, via a multiplexer, to at least one peripheral unit to be driven, only one of the two processors driving the peripheral unit at a particular time. The synchronous execution of the control program is monitored by a comparison unit. A synchronization error signal is output when the two processors are desynchronized. After a synchronization error signal has been output, the execution of the control program by the two processors is first of all interrupted. A test is then carried out in order to check whether one of the two processors is defective. If both processors are error-free, the synchronous execution of the control program by the two processors is continued. In contrast, if one of the two processors was identified as being defective, the multiplexer and the comparison unit are configured in such a manner that no further communication with the defective processor and no further monitoring by the comparison unit take place and the error-free processor drives the peripheral unit. The execution of the control program is continued by the error-free processor. If both processors are defective, the controller is switched off.

According to one or more embodiments of this invention, the test comprises the simultaneous execution of at least one test program by both processors, a processor being considered to be defective when at least one of the following conditions is met:

the processor has not executed the test program within a first period of time T1, the processor has not successfully executed the test program, the processor has not changed to the quiescent state for a second period of time T2 after the first period of time T1 has elapsed.

This is intended to ensure that not only the correct or incorrect execution is taken into account but also whether the processors have executed the test within a predefined time. Checking the quiescent state is used to determine whether a processor nevertheless outputs data even though it is not executing any instructions. This likewise indicates a defective processor.

According to one or more embodiments of this invention, the synchronization error is assessed and is assigned to an error type, wherein at least one test program is selected on the basis of the error type in order to check the processors. This makes it possible to select one or possibly more error-specific test programs.

BRIEF DESCRIPTIONS OF THE DRAWINGS

Further embodiments, modifications and advantages are described in the following description, drawings and in the claims. The invention is now described using specific exemplary embodiments illustrated in the figures. However, said embodiments should not be interpreted as being restrictive. Further modifications which are intended to be concomitantly included in the scope of protection emerge for a person skilled in the art from the following description.

DETAILED DESCRIPTION OF THE INVENTION

Figure 1:
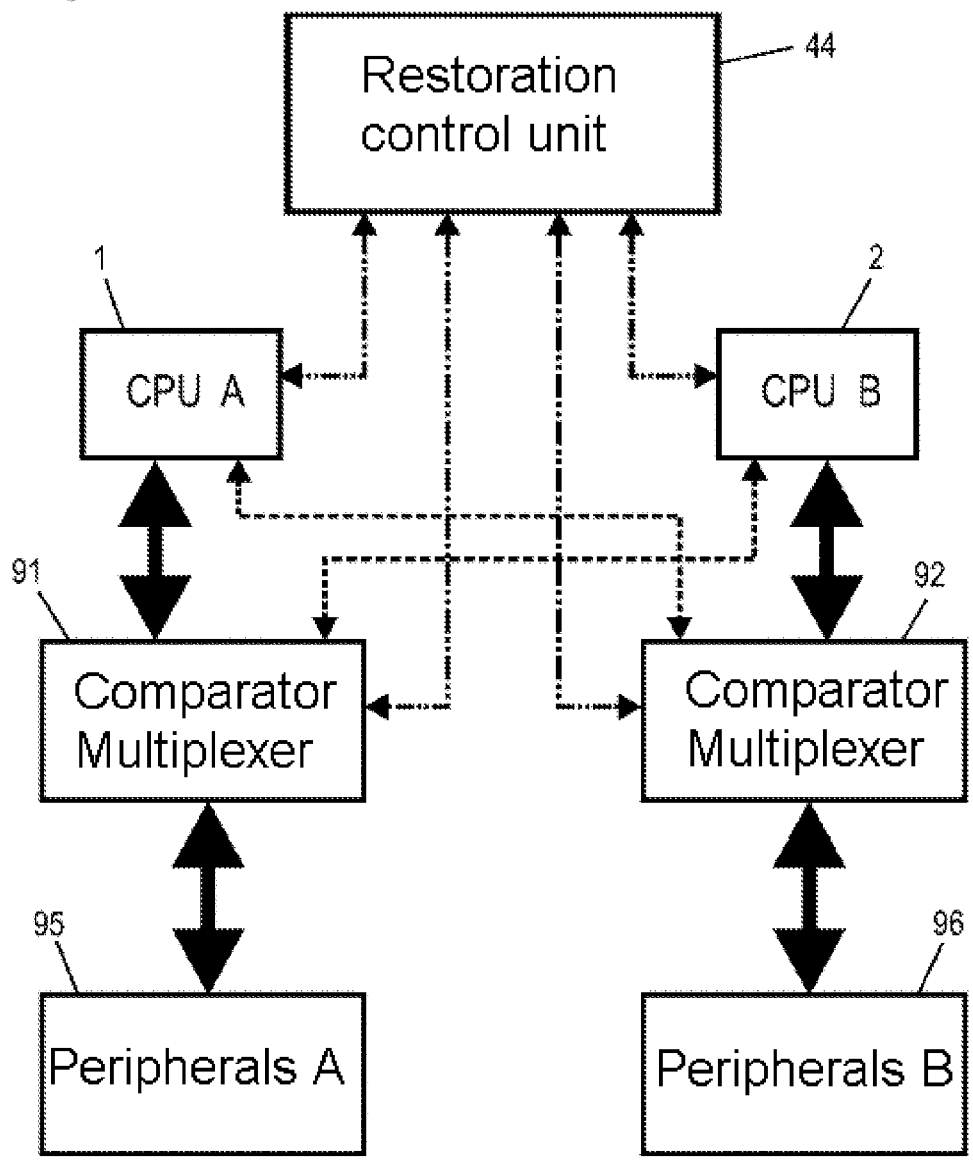
FIG. 1 shows a control computer system in the form of a control apparatus according to one embodiment in the normal mode.

FIG. 1 schematically shows a control computer system or a control apparatus having a first processor 1 (shown as CPU A) and a second processor 2 (shown as CPU B) and a first multiplexer 91 and a second multiplexer 92. Each of the multiplexers 91, 92 forms a unit with a respective comparison device which is designated a comparator/multiplexer in the figures (and referred to in this manner in this description). Each of the multiplexers 91, 92 is connected to a respective peripheral unit 95, 96 and makes it possible for the processors 1, 2 to optionally access the peripheral units 95, 96. A restoration control unit 44 is connected both to the two processors 1, 2 and to the multiplexers 95, 96.

The processors 1, 2 may also be processor cores.

The bold arrows illustrated in FIG. 1 show the data flow actually conveyed by the multiplexers 91, 92 from the processors 1, 2 to the peripheral units 95, 96. Processor 1 communicates with peripheral unit 95 and controls the latter, and processor 2 communicates with peripheral unit 96 and controls the latter. In this case, processor 1, multiplexer/comparator 91 and peripheral unit 95 form a branch A, while processor 2, multiplexer/comparator 92 and peripheral unit 96 form a branch B. However, there are cross communication paths, to be precise between processor 2 and multiplexer/comparator 91, on the one hand, and between processor 1 and multiplexer/comparator 92, on the other hand.

The multiplexer/comparators 91, 92 each compare whether the processors 1, 2 are operating synchronously with respect to one another, that is to say whether they output the same results at the same time. If this is not the case, there is a synchronization error. In this case, the processors 1, 2 are tested and the control device is reconfigured on the basis of this. This is schematically illustrated in FIG. 2.

Figure 2:
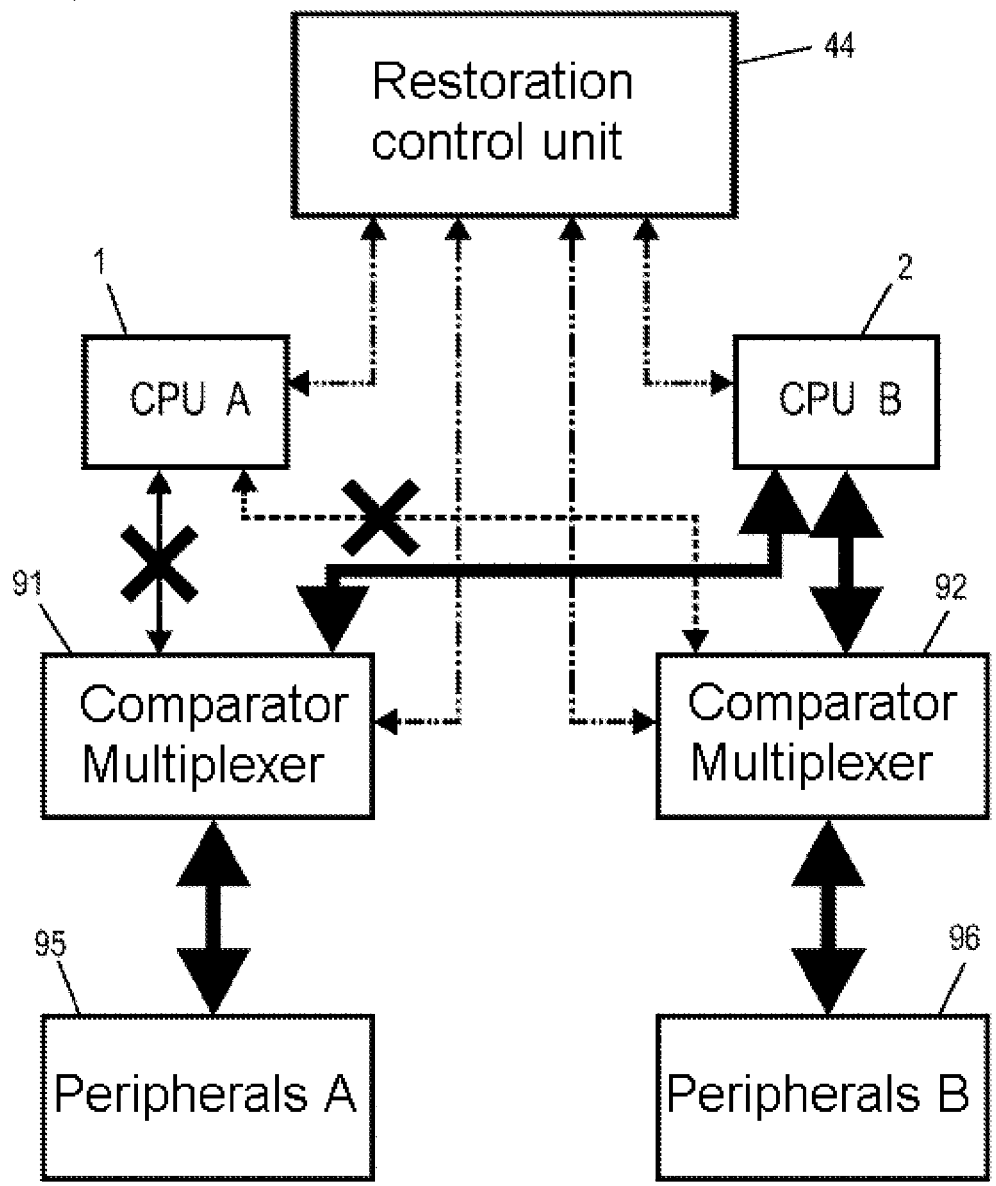
FIG. 2 shows the control computer system (control apparatus) when a processor fails.

In FIG. 2, it was assumed that the test, which is monitored and evaluated by the restoration control unit 44, revealed that processor 1 is defective. In this case, the two multiplexers 91, 92 are reconfigured, to be precise in such a manner that both multiplexers 91, 92 ignore the outputs from processor 1. At the same time, multiplexer 91 now allows communication between processor 2 and peripheral unit 95. Processor 2 now drives the peripheral units both in the branch A and in the branch B. Processor 2 need not necessarily be programmed differently for this purpose since processor 2 had already executed the control program for the peripheral unit 95 (branch A) in the normal state for comparison purposes. The difference is only that it now can also have "write" access to peripheral unit 95. The comparison function of the comparators is also deactivated since the latter now no longer receive inputs from processor 1. This is necessary so that the multiplexer/comparators 91, 92 do not output any further error signals.

As a result, the execution of the control program, comprising control programs for peripheral unit 95 and peripheral unit 96, can be continued again. This increases the availability of the system.

If the test revealed that both processors 1, 2 are error-free, the state in FIG. 1 is assumed again. If both processors 1, 2 are defective, the system is switched off.

The procedure shown in FIGS. 1 and 2 is advantageous, in particular, in peripheral units which are not designed to be redundant.

The architecture shown in FIGS. 1 and 2 comprises a division of peripheral modules into two groups A and B. Each group comprises at least one processor 1, 2, a bus changeover switch (bus matrix, bus crossbar) (not shown here) and peripheral modules 95, 96 to be driven. Memory modules may be implemented in one group or in both groups. The side A is actually (that is to say physically) always driven by the processor 1 (CPU A). The side B is actually always driven by the processor 2 (CPU B). Data from the peripheral module 95 can be passed transversely to the side B via the multiplexers 91, 92. The processor 1 may read data from peripheral molecule 96 in a similar manner.

Figure 3:
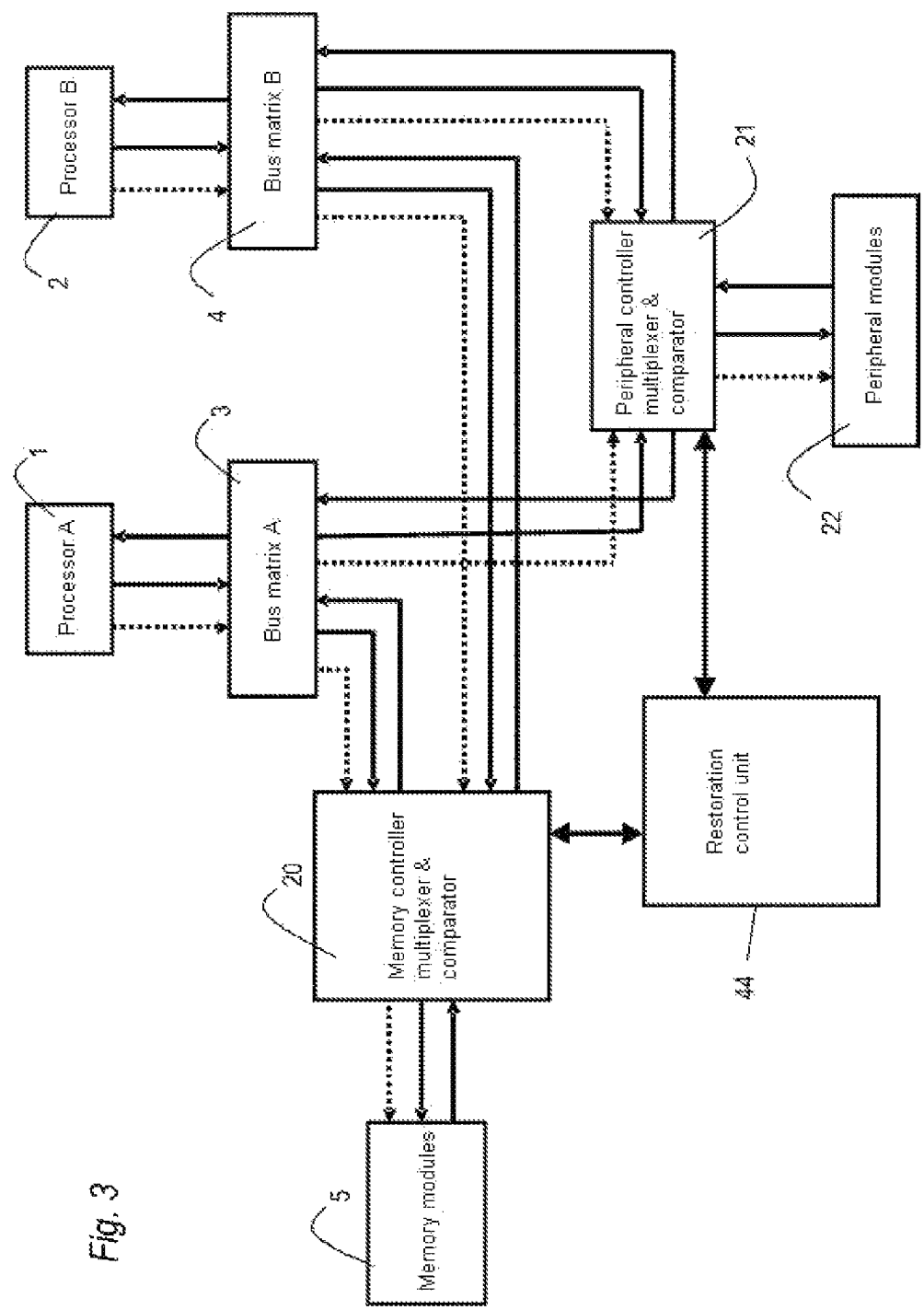
FIG. 3 shows a control computer system in the form of a control apparatus according to one embodiment.

FIG. 3 shows an embodiment in which a peripheral unit 22, which is referred to as peripheral modules there, is redundantly driven by two processors 1 and 2, only one of the two processors actually driving the unit 22 at a predefined time. This is effected via a multiplexer 21. A further peripheral unit 5, which may be a common internal peripheral unit, for example a memory 5, is connected to the two processors 1, 2 via a multiplexer 20. The processors 1, 2 themselves are each connected to the multiplexers 20, 21 via a bus matrix 3, 4. In this embodiment too, the multiplexers 20, 21, which are present in a unit with respective comparison units (comparators), may be configured in a suitable manner in the event of an error in order to keep the controller available.

According to one or more embodiments, there is a clear separation between jointly used areas of the controller and private redundant areas of the controller. Private components or units are assigned to each processor 1, 2 and are driven only by said processor. The private components (the two peripheral units 61, 62 in FIG. 4) are preferably redundant in order to be able to simulate a perfect symmetry of the redundant private areas as far as possible. For financial reasons, some components, for example the program memory, may be implemented only once, to be precise in the jointly used area. In the lockstep mode, the two processors 1, 2 operate synchronously. The actual driving of the jointly used components or peripheral units can be assumed by any of the two redundant processors and is actually carried out only by one processor at a particular time, while the other processor receives all data in good time on account of the lockstep mode.

After a lockstep error has been detected, each processor 1, 2 is intended to remain active as far as possible in the allocated private area during a time interval T1 and is not intended to execute any safety-relevant function with effects outside the architecture. That is to say the driving of external peripheral units or components which have an external effect is interrupted, in particular.

For the necessary access to non-redundant components, for example the program memory, a multiplex mode for the two redundant processors 1, 2 is made possible in the time interval T1. Each lockstep error triggers an interrupt in the program sequence. In the interrupt routine, the processors 1, 2 will execute the same test programs independently of one another and store test results for later checking by means of an autonomous hardware monitoring module, in the figures the restoration control unit 44.

Some test programs can be derived from the error context. For example, the error which has occurred is classified and is assigned to an error type, and this assignment is used to select the respective test program or programs.

Each processor is intended to exit the execution of the interrupt gently without a rebound. The background is that the test program was started by an interrupt and, after the test program ends, the processors 1, 2 normally wish to continue the control program again which was interrupted owing to the interrupt. This is intended to be prevented, and the processors 1, 2 are instead intended to change to a quiescent state. Whether this takes place is also a part of the test.

Each processor 1, 2 is intended to subsequently store its state features, for example, in a register which can be read by the autonomous hardware monitoring module (restoration control unit 44). The period of time is measured using a timer of the autonomous hardware monitoring module.

After this unclear time (outside the lockout mode), the redundant processors are intended to have an idling mode (quiescent state) for a period of time T2. If a processor accesses a component, for example a memory module or peripheral module, in the period of time T2, it is automatically excluded from the recovery process by the restoration control unit 44. After the time window T2, the restoration control unit 44 compares the test results of the two processors 1, 2 with the values preprogrammed in the hardware. If the test results of a processor do not correspond to the predefined values, the corresponding processor is no longer considered for the running synchronization attempt. Accordingly, the stored state features of the processors 1, 2 must also be suitable for a recovery. In the case of a positive assessment of the results, the restoration control unit 44 will bring about a return into the lockstep mode by means of an interrupt. If only one processor has successfully carried out all the tests, it will drive the peripheral modules assigned to it and all the jointly used components.

This emergency mode increases the availability of the system and runs with a reduced safety level.

Figure 4:
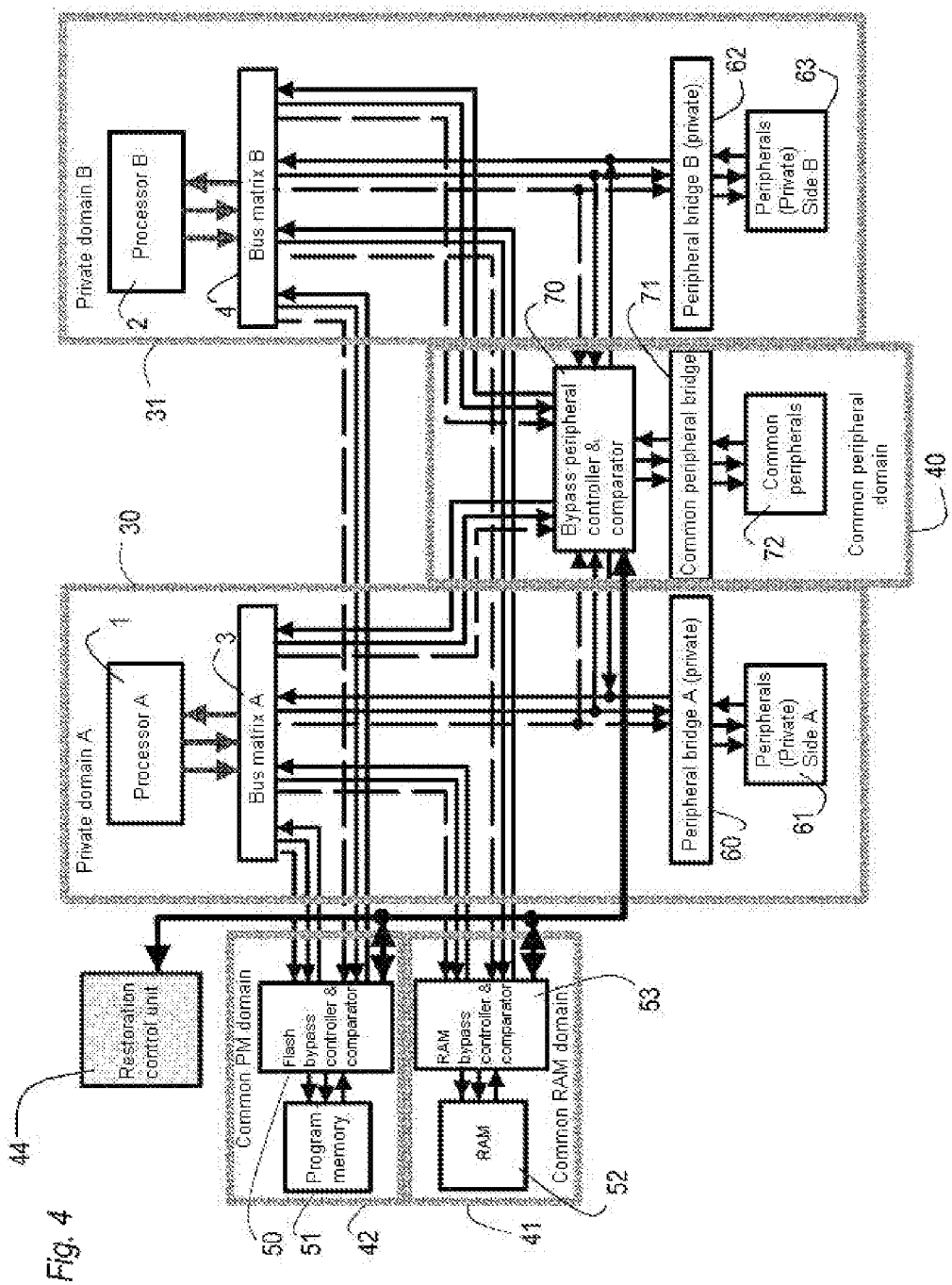
FIG. 4 shows a control computer system in the form of a control apparatus according to one embodiment.

FIG. 4 shows a further embodiment which builds on that in FIG. 3. The architecture of the control apparatus is divided into two private areas 30 and 31, which are referred to as areas A and B, and a common area 40. The private areas 30, 31 contain modules or peripheral units and components which are physically redundant. The restoration control unit 44 in the form of a hardware module is used to reliably recover the synchronization after a lockstep error. If a lockstep error occurs, the restoration control unit 44 will block all access to safety-relevant peripheral modules or units. These units are, in particular, the common peripherals 72 and, as an example, the redundantly present peripheral units 61 and 63. These are connected via respective peripheral bridges 60, 71 and 62.

The lockstep error triggers an interrupt in the program sequence. In the following execution of the interrupt routine, each processor 1, 2 can access only modules which are located in a private area assigned to it and do not carry out any safety-relevant partial functions. Furthermore, access to non-safety-relevant components 41, 42 can be made possible in the multiplex mode. Such components 41, 42 are, for example, a common program domain 42 and a common RAM domain. Component 42 has a module 50, which comprises a multiplexer, a controller and a comparator, and the actual program memory 51. Component 41 has a module 53, which comprises a multiplexer, a controller and a comparator, and the memory 52 which is embodied here as RAM.

In the private peripheral area, in each case a small address space is reserved for test purposes of the suitable processor. The interrupt routine is used to check the integrity of the architecture and, above all, of the processors. At the end of the interrupt execution, the processors are intended to store the calculated results in the address area which is reserved for test purposes. Correct results are stored in advance in the restoration control unit 44. The interrupt routine is composed of test programs, each test program being intended to supply the correct result within a particular time interval. After a predefined period of time, the restoration control unit 44 checks the correctness of the results stored by the processors. The recovery of the lockstep mode presumes that all the results to be checked by the restoration control unit 44 are correct. Otherwise, only the processor which has correct results will continue to remain active for the running application.

Since the interrupt routine does not run in the lockstep mode, the module 50 is configured in such a way that both processors 1, 2 can access the program memory 51 in the multiplex mode.

Figure 5:
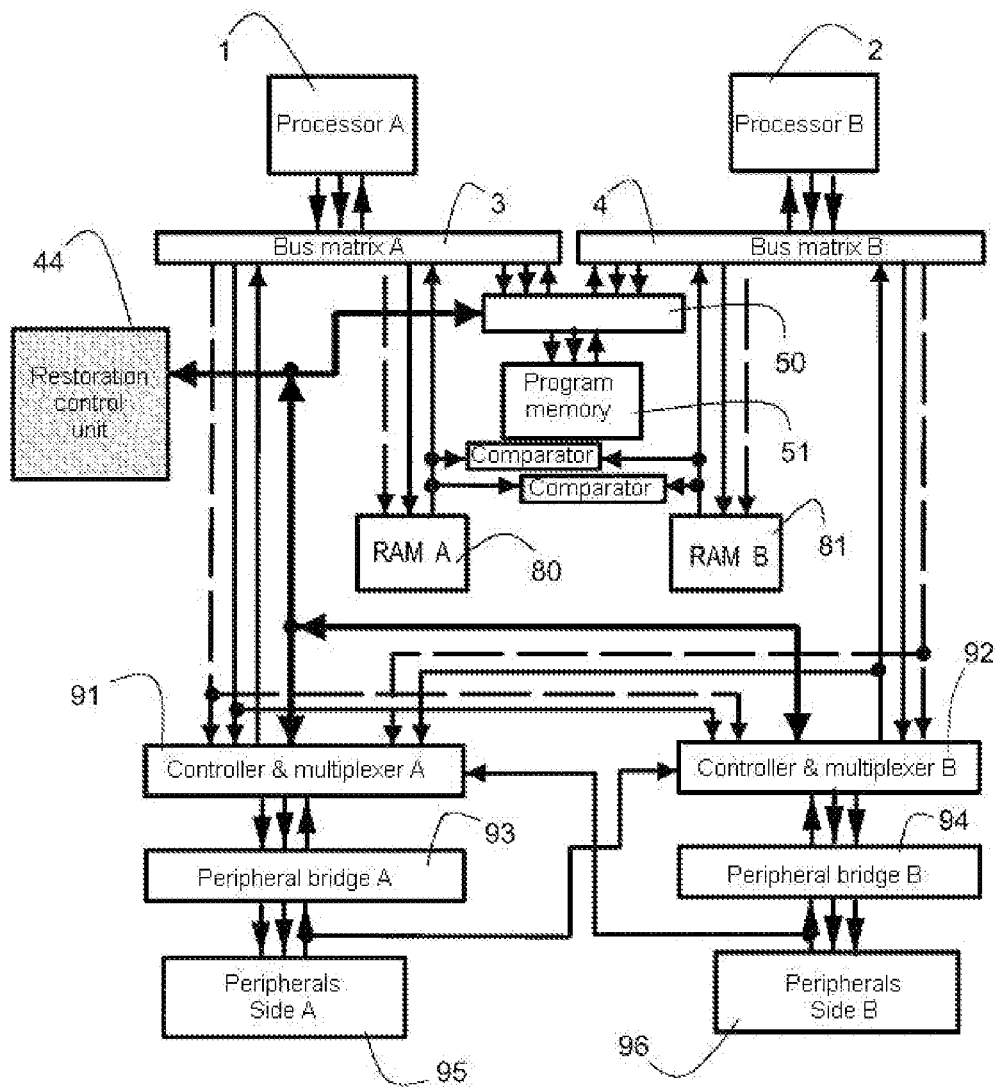
FIG. 5 shows a control computer system in the form of a control apparatus according to one embodiment.

FIG. 5 showed an embodiment as an extension of FIGS. 1 and 2. In this case, the restoration control unit 44 operates in a similar way to that in FIG. 4. If a processor 1, 2 does not supply any correct results for the recovery of the lockstep mode, the restoration control unit 44 will configure the corresponding peripheral controllers 91 or 92, which form the multiplexers and comparators here, in such a way that the peripheral modules or units 95, 96 below them are driven by the other processor. Peripheral bridges 93, 94 act between controllers 91,92 and peripheral units 95, 96.

The architecture in FIG. 5 also has two redundant RAM modules 80, 81. If the lockstep error has been caused by an error in RAM, the defective RAM address is stored. This address is checked in the interrupt routine. If the RAM error cannot be corrected, the restoration control unit 44 will not integrate the affected side A or B (that is to say the processor and RAM) into the active driving again. The restoration control unit 44 will subsequently ensure that the peripheral modules, which were previously driven by the processor or RAM which is now defective, are now driven by the processor on the other side.

Figure 6:
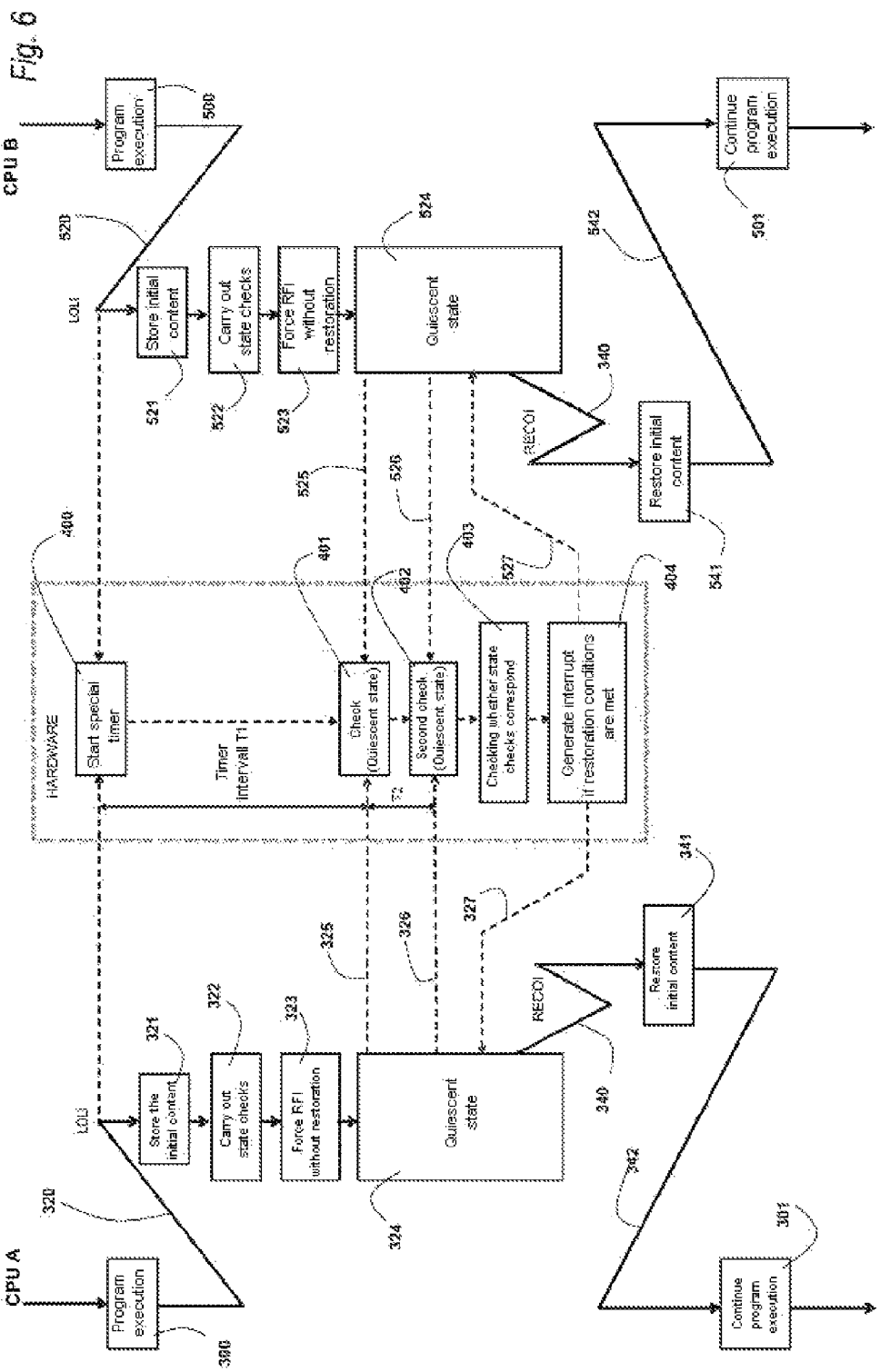
FIG. 6 shows the sequence of a control program according to one embodiment.

FIG. 6 schematically shows the sequence of a control program. After a synchronization error has occurred, the program execution 300, 500 by the respective processors is interrupted by means of an interrupt (LOLI, Lockstep Loss Interrupt) and the respective state (initial content) is stored in 321, 521. The interrupt simultaneously leads to the activation of the restoration control unit, referred to as hardware here.

The restoration control unit starts a timer 400. The processors then carry out, in step 322, 522, the tests predefined by the restoration control unit, wherein, after the tests have been concluded, an interrupt-free return to 323, 523 is forcibly brought about (RFI, Return From Interrupt). The processors are then intended to change to a quiescent state.

The restoration control unit checks whether the tests have been processed within the period of time T1 (325, 525) and whether the processors have changed to the quiescent state (401). After a predefined period of time T2, the restoration control unit checks in 402, 326, 526 whether the processors are still in the quiescent state.

The test results are then checked. The restoration conditions 404 are that the test results are error-free, that the respective processor had changed to the quiescent state by the expiry of the period of time T1, and that the processor is still in the quiescent state after the expiry of the period of time T2. If this is the case for both processors, a recover interrupt (RECOI) is triggered for both processors, otherwise only for the error-free processor, and the initial state is restored (341, 541). In the latter case, the restoration control unit reconfigures the control apparatus, as explained above. This is followed by the continuation of the program.

Figure 7:
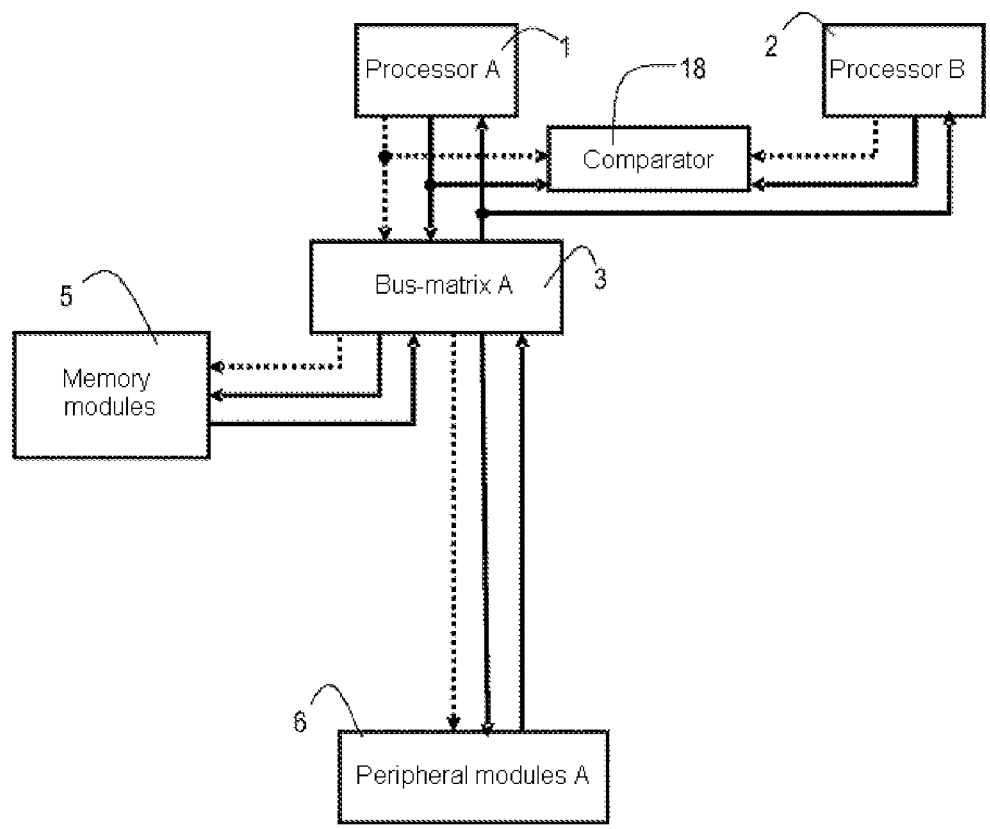
FIG. 7 shows an architecture having two processors.

FIG. 7 shows a conventional architecture with two processors 1 and 2, wherein the processor 2 is used to monitor the processor 1. The entire driving of peripheral modules and all memory access operations take place via the processor 1. This architecture is unsuitable for coping with errors (lockstep failures) which result from the loss of synchronization.

Figure 8:
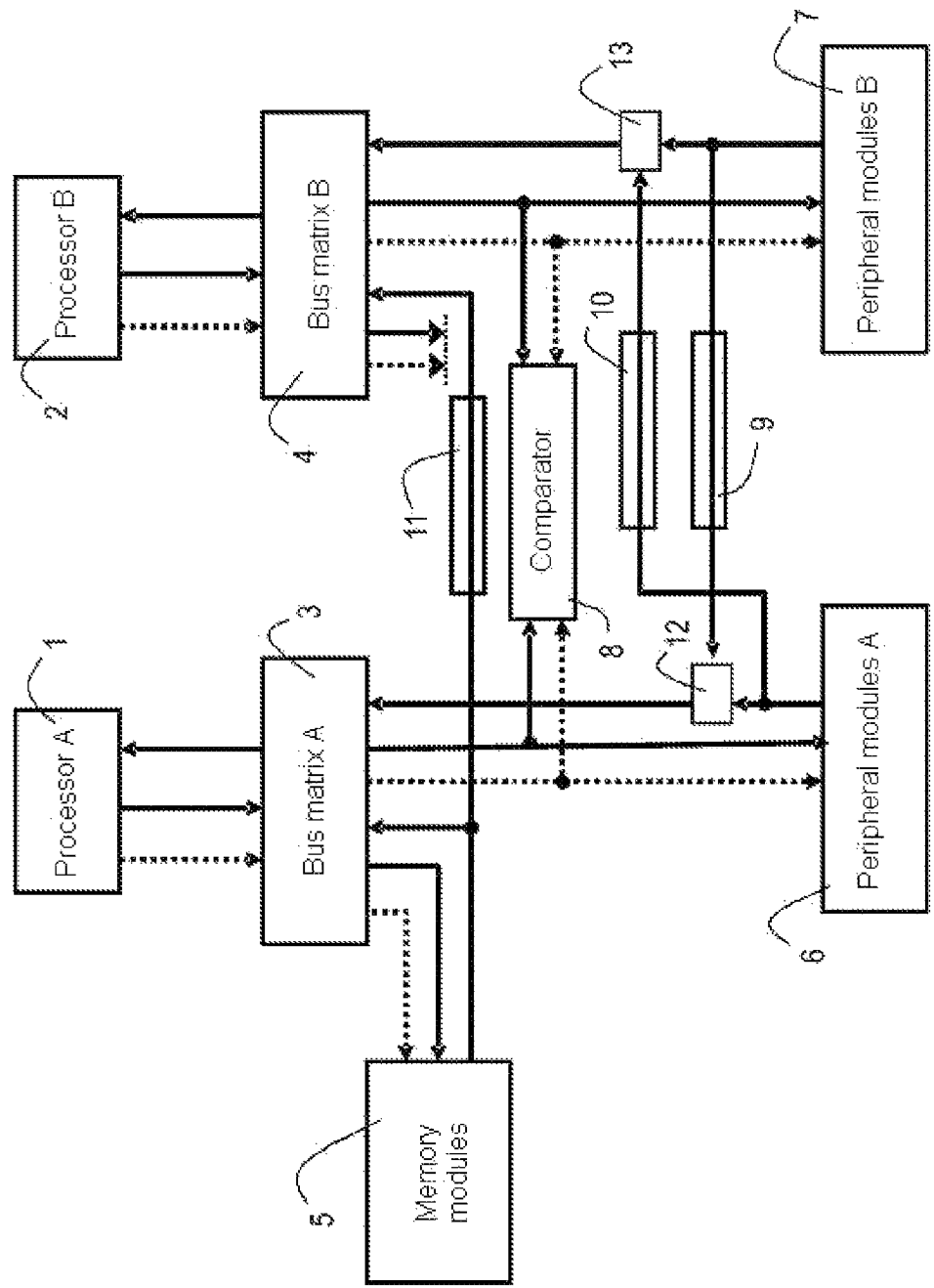
FIG. 8 shows an architecture with a division of peripheral modules into two groups A and B.

FIG. 8 shows a conventional architecture with a division of peripheral modules into two groups A and B. Each group comprises at least one processor 1, 2, a bus changeover switch (bus matrix, bus crossbar) 3, 4 and peripheral modules 6, 7. Memory modules 5 can be implemented in one group or in both groups and driven by means of a bypass module 11. The side A is actually (that is to say physically) always driven by the processor 1. The side B is actually always driven by the processor 2. Data from peripheral modules 6 can be passed transversely to the side B via a bypass module 10 and data multiplexer 12. The processor 1 can read data from peripheral modules 6 in a similar way (via bypass module 9 and data multiplexer 13). This mechanism, with which a processor can read peripheral data from the other side, functions only as long as the two processors 1 and 2 operate synchronously (in lockstep) with respect to one another. The monitoring is carried out by means of a comparator 8. If the processor 1, for example, is non-operational, the entire side A (that is to say together with peripheral modules and memory on this side) can no longer be driven. This results in poor support of a high level of availability. If the two processors no longer operate synchronously, they can only be reset. For many safety-relevant applications, the reset of processors is not allowed until the cause of the loss of synchronization has been clearly identified.

Two-processor control devices were described in connection with FIGS. 1 to 8. Control devices having a plurality of processors or processor cores are described below using control computer systems. However, the number of processors or processor cores is not restricted to the specifically stated number but rather may be arbitrary according to the requirements.

Figure 9:
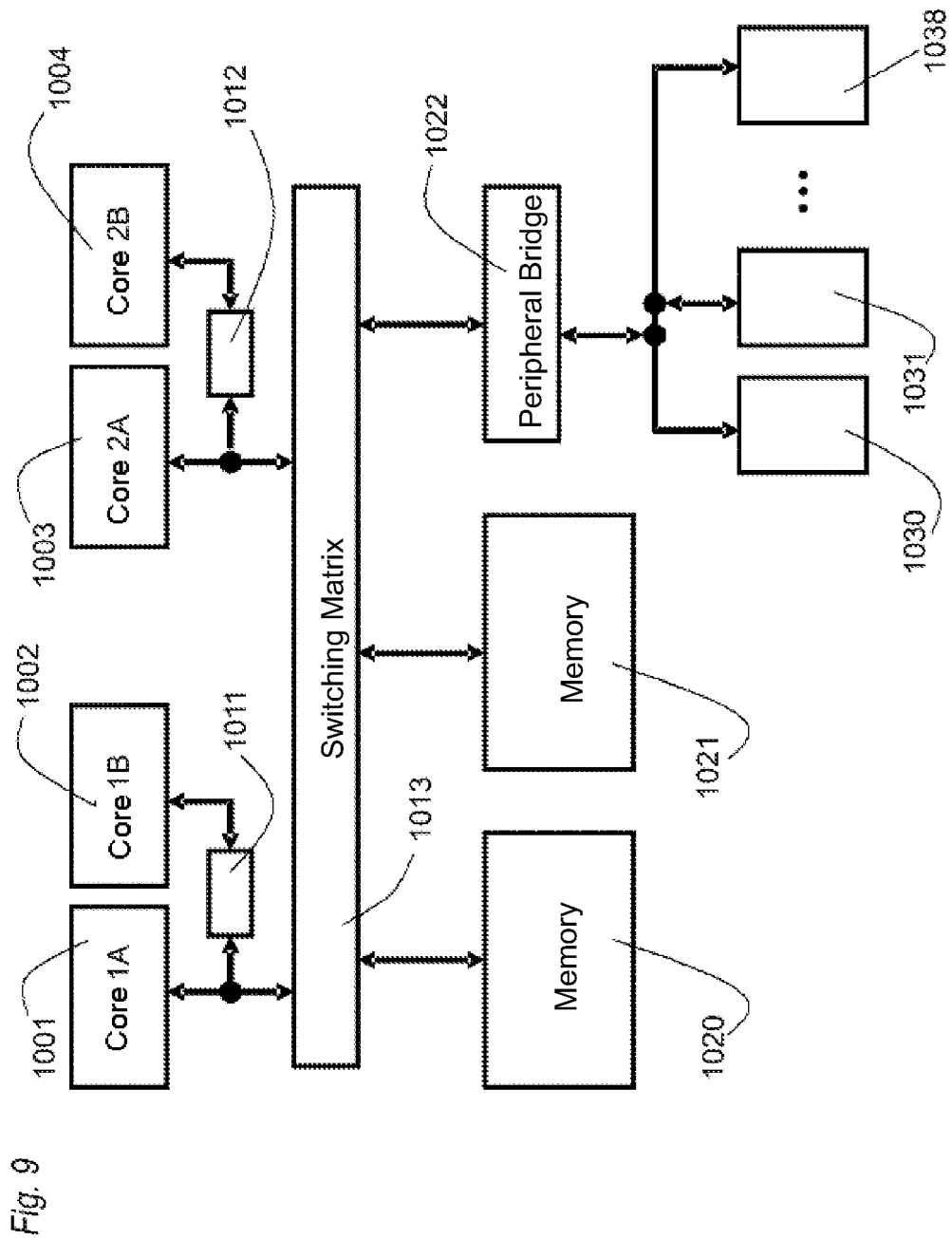
FIG. 9 shows a control computer system.

FIG. 9 shows a control computer system (control device). Said system comprises two processor pairs 1001, 1002 (or cores 1A, 1B) and 1003, 1004 (or cores 2A, 2B), two comparison units 1011 and 1012, a switching matrix 1013 (which is also referred to as a switching element), memories 1020 and 1021 and a peripheral bridge 1022 to which a plurality of peripheral units 1030, 1031, 1038 are connected. Each processor pair may comprise two separate processors or may be a processor having two cores. In further embodiments, the number of processors or cores may also be different, as desired. For example, it is possible to use three or more processors each having two cores which are each redundant with respect to one another. In principle, however, three processors may also be combined to form a redundant group, the control computer system being able to have two, three or more of such groups.

In the first processor pair, processor 1001 (or core 1A) actually accesses different resources such as memories and peripheral units. Comparison unit 1011 compares the output data from the processors 1001, 1002 and passes incoming data to both processors, the monitoring processor 1002 not having access to memories and peripherals. Both processors (cores) 1001, 1002 have an identical construction and operate synchronously or in the lockstep mode, as a result of which comparison unit 1011 respectively receives the same output data when there are no errors. Processor pair 1003, 1004 has a corresponding construction; processor 1003 actually accesses memories and peripherals and comparison unit 1012 also forwards incoming data to monitoring processor 1004. Switching matrix 1013 makes it possible for the processors to access memories or peripheral units. Peripheral units are accessed each time via a central peripheral bridge 1022. When there are no errors, the control computer system thus provides two independent processors 1001 and 1003 (processor cores 1A and 2A).

Figure 10:
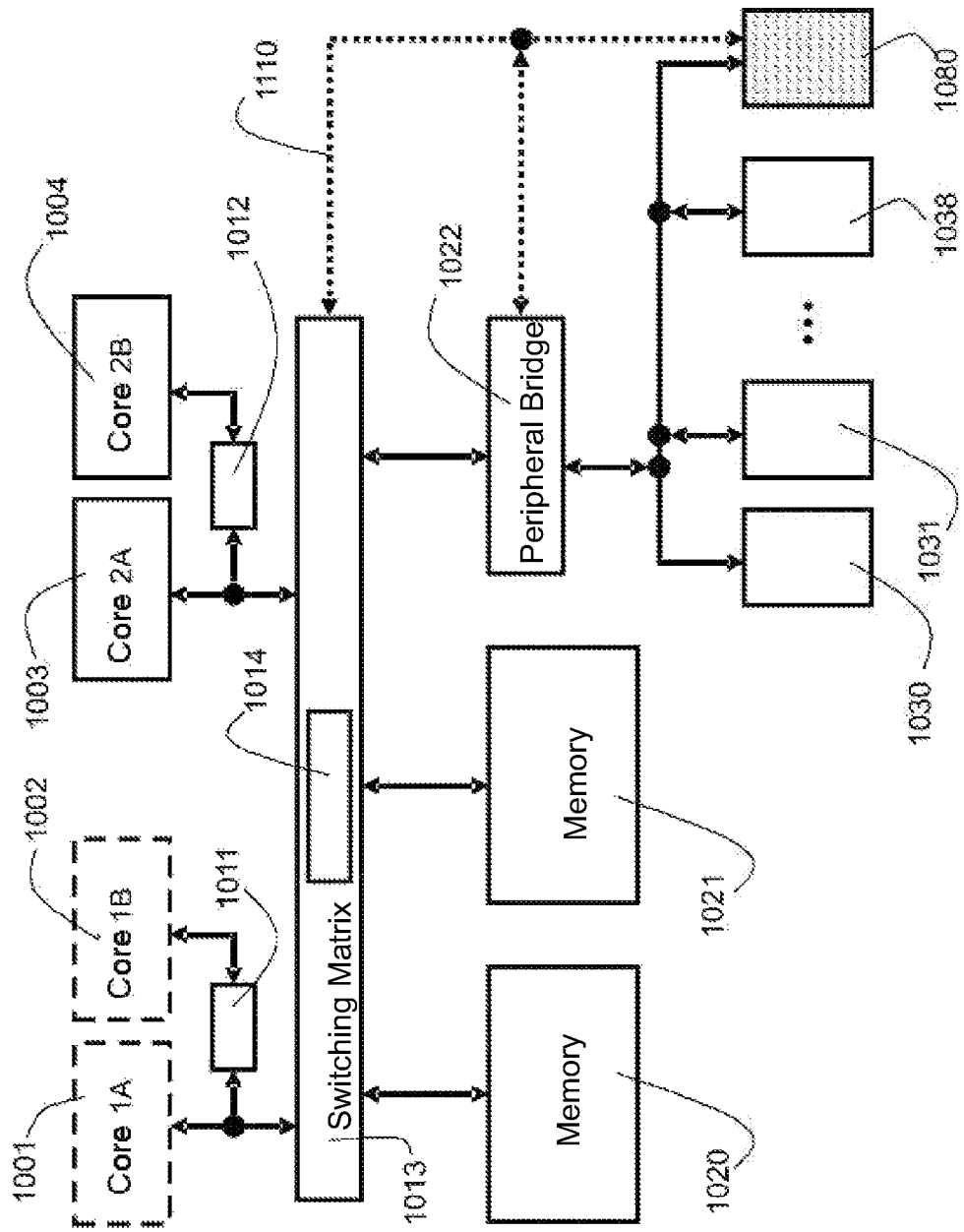
FIG. 10 shows a control computer system according to one embodiment.

FIG. 10 shows an exemplary embodiment of a control computer system according to the invention. Like the control computer system shown in FIG. 9, said system comprises two processor pairs 1001, 1002 and 1003, 1004, two comparison units 1011 and 1012, a switching matrix 1013, memories 1020 and 1021 and a peripheral bridge 1022 to which a plurality of peripheral units 1030, 1031, . . . 1038 are connected. In addition, the control computer system according to the invention has an error-handling unit (restoration unit) 1080 which receives signals from the comparison units 1011, 1012. Error-handling unit 1080 can drive switching matrix 1013 and peripheral bridge 1022 in order to prevent access to memories and/or peripheral units by an individual processor 1001, 1002, 1003, 1004 (or core 1A, 1B, 2A, 2B) or a processor pair. In one preferred embodiment of the invention, switching matrix 1013 comprises a monitoring unit 1014 which can not only prevent but can also log access. The signals from the comparison units 1011, 1012 are preferably directly transmitted to the error-handling unit 1080 and do not pass through the switching matrix 1013. As already described further above in connection with the restoration control unit, error-handling unit 1080 is set up to reconfigure the switching matrix 1013 or the peripheral bridge 1022 in a suitable manner after the occurrence of an error.

If a comparison error occurs, for example between the processors 1001 and 1002 (or cores 1A and 1B of the first processor pair), the error-handling unit 1080 transmits control signals 1110 to the switching matrix 1013 and peripheral bridge 1022. Access to the memory by the processor pair 1001/1002 is then prevented or logged and/or access to peripheral units is prevented. This prevents a defective processor from driving actuators, for example, which could result in significant damage.

In other words: the conventional architecture is expanded by a module 1080 which assumes the function of the restoration control unit. This module 1080 is also referred to as an SAM (Safety and Availability Management) module. Depending on the type of error which has occurred, SAM module 1080 controls the monitoring unit 1014 inside the switching element (switching matrix) 1013 in order to prohibit the defective processor from accessing particular peripheral modules and RAM memories. The SAM module 1080 is immediately informed if the comparators in the modules (comparison units) 1011 and 1012 have detected an error. SAM module 1080 uses the error signals to ensure that the affected processor core 1A or 2A (processors 1001, 1003) cannot drive actuators via peripheral modules. The SAM module 1080 can use control signals 1110 to prevent access to peripheral modules in the switching element 1013 or in the peripheral bridge 1022.

Figure 11:
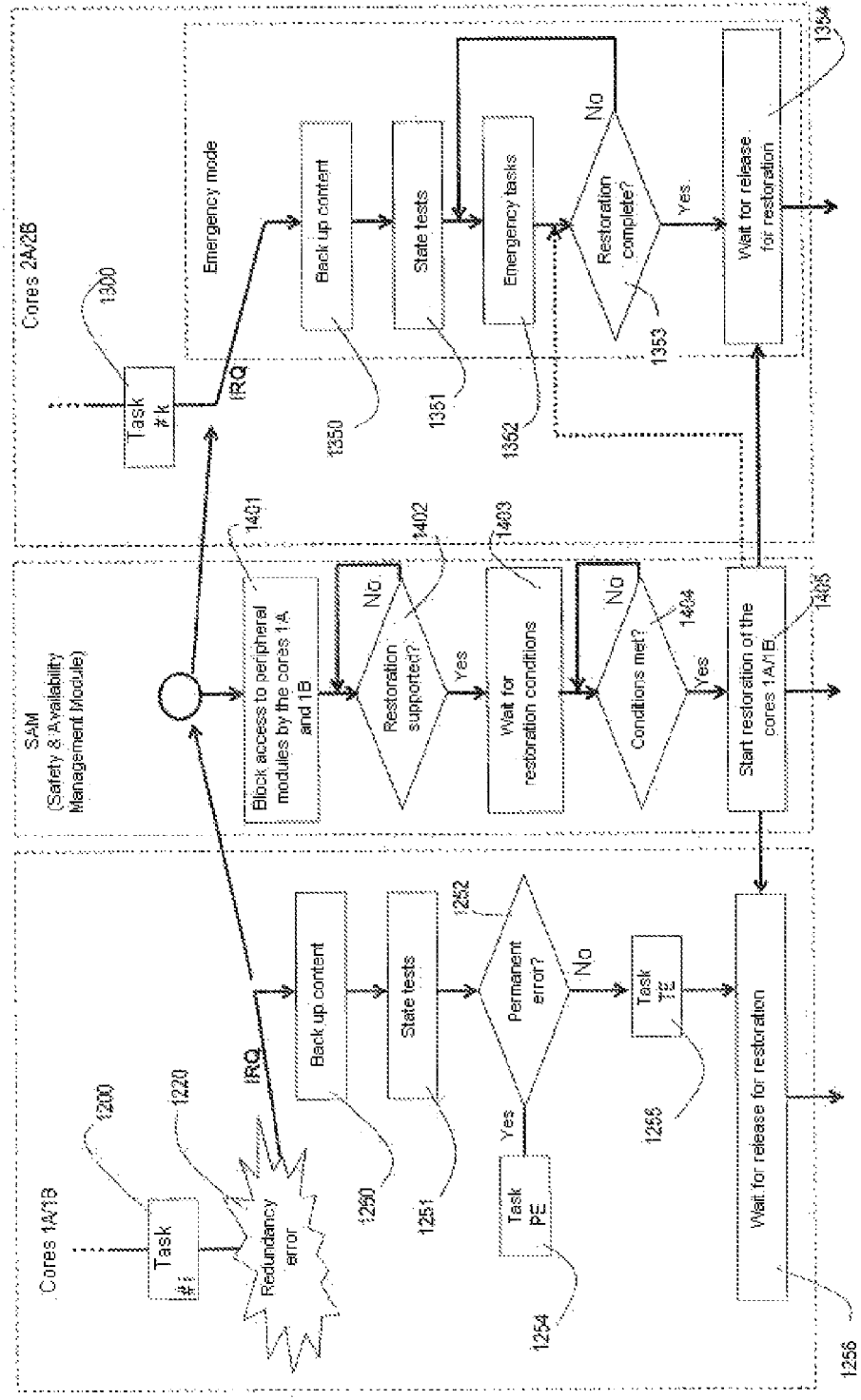
FIG. 11 shows a flowchart for an error-handling method according to one embodiment.

FIG. 11 shows an exemplary embodiment of the method according to the invention for driving a control computer system, the configuration of the control computer system corresponding to the configuration described using FIG. 10.

If the comparator in the module (comparison unit) 1011 detects an error 1220, an interrupt is triggered for both processor pairs 1A/1B and 2A/2B. The processor pair 1A/1B exits the task 1200 and jumps to the execution of the interrupt routine. The context or content for the normal mode is stored in the step 1250 before the processor pair 1A/1B is subjected to checking or state tests in the step 1251. In the enquiry 1252, the processor pair 1A/1B checks whether the error is permanent. If the processor pair 1A/1B has a permanent error, this pair is no longer taken into account for restoration. In the step 1254, the type of error is determined and is stored in a nonvolatile memory, for example an external EPROM. In the step 1255, the signature and a time stamp of the transient error are stored. If the same transient error is repeated, the data stored in the step 1255 are intended to help to determine the repetition rate. Such a repetition rate can be used as a decision-making criterion for further restoration attempts. In the step 1256, the processor pair 1A/1B waits for a signal from the SAM module 1080 as regards whether a restoration attempt is intended to take place.

After the interrupt signal has been triggered, the processor pair 2A/2B, as the error-free processor pair, is intended to enter the emergency mode. The processor pair 2A/2B first of all exits the task currently being executed in 1300 and stores the context for the normal mode (step 1350). Error-based checking tests are carried out in the step 1351. Only the program parts (obligatory software modules) needed for the emergency mode are executed in the step 1352. These necessary program parts are composed of selected tasks which were originally assigned to different processor pairs. During the emergency mode, the processor pair 2A/2B permanently checks whether a signal for a restoration attempt has been released. If the restoration of the normal mode is released in the step 1353, the processor pair 2A/2B waits for the release for the restoration attempt in the step 1354.

After the interrupt signal has been triggered, the SAM module 1080 blocks all access to safety-relevant peripheral modules by the defective processor pair 1A/1B in the step 1401. This step is intended to avoid any unsafe driving of actuators. If the restoration of the normal mode is not intended to be supported, the SAM module 1080 remains in the step 1402 and driving is effected only by the processor pair 2A/2B. Otherwise, the SAM module 1080 is set to the conditions needed for the restoration attempt in the step 1403, which conditions are intended to be provided by the failed processor pair. These conditions are then checked in the step 1405. If the restoration conditions have been met, the SAM module 1080 initiates the restoration attempt with all processor pairs. After successful restoration, the full performance of the control computer system is thus available again and non-safety-critical convenience functions are also again provided without limitation.

Restoration, in particular checking, can be carried out according to the sequence shown in FIG. 6.

According to one embodiment, the drive software of the control computer system is prepared in a suitable manner for errors which may occur and the handling of the latter. The drive software comprises at least two types of software modules: the obligatory software modules, on the one hand, and the optional software modules, on the other hand. The modules are divided between both processor pairs in the normal mode. In the event of a fault, the obligatory software modules (also referred to as emergency modules) are executed by the remaining processor pair but the optional software modules are not executed or are executed only to a limited extent. It is thus possible for the error-free processor pair to also accept the obligatory software modules of the defective processor pair. The software modules absolutely essential for driving the peripherals can therefore continue to be executed without resulting in a loss of redundancy. Only the optional software modules are not executed or are only partially executed. However this does not restrict safety.

Figure 12:
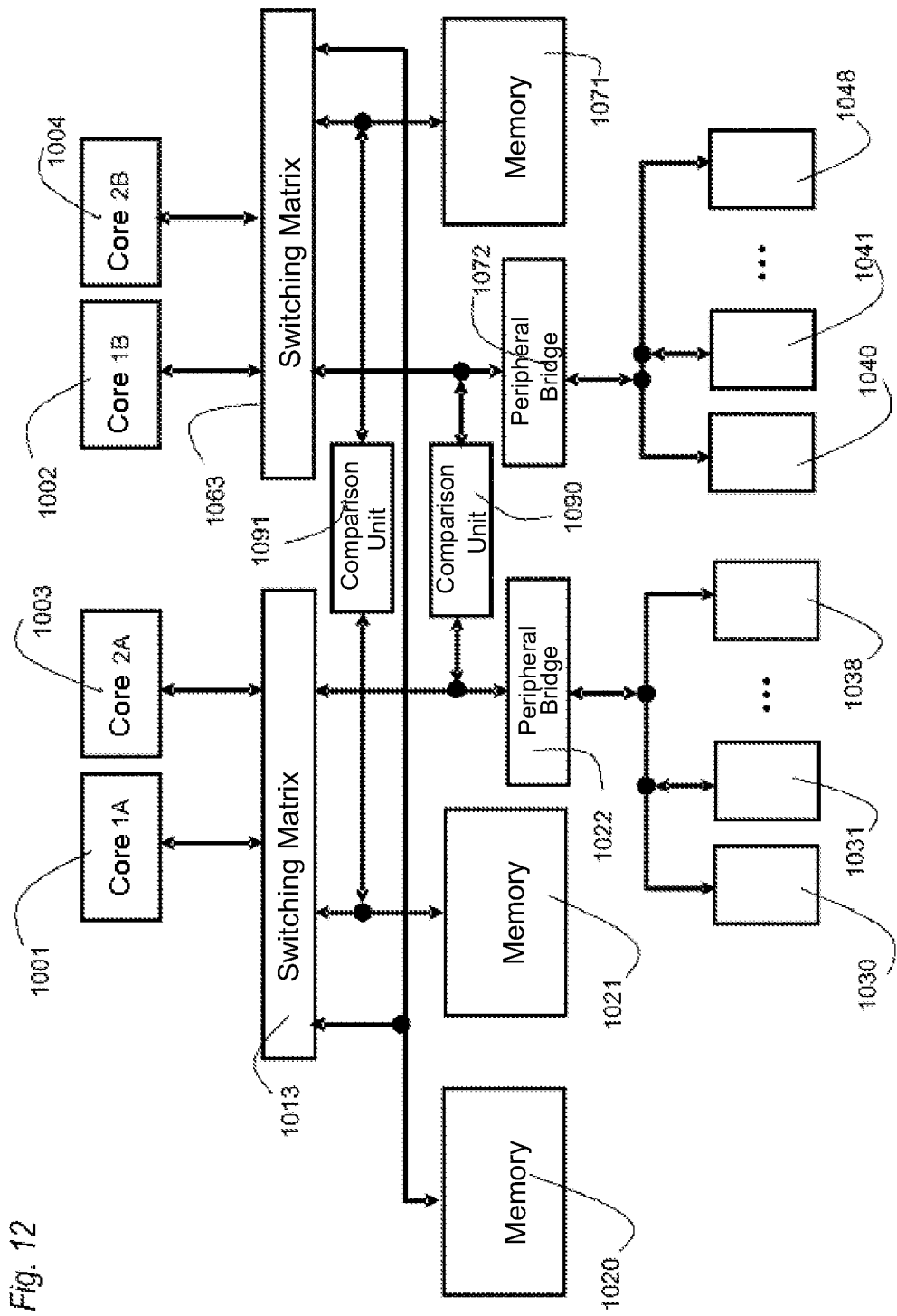
FIG. 12 shows a further control computer system.

The further architecture of a control computer system having two processor pairs, as shown in FIG. 12, has two redundant switching elements (or switching matrices) 1013, 1063. Processor cores 1A and 2A (processors 1001, 1003) can access memory modules 1020 and 1021 via switching element 1013. Processor cores 1B and 2B (processors 1002, 1004) access memory modules 1020 and 1071 via switching element 1063. Memory module 1021 can be used only by the processor cores 1A and 2A, while memory module 1071 is available only to the processor cores 1B and 2B. The block consisting of processor cores 1A and 2A, switching element 1013 and memory module 1021 is thus completely symmetrical (redundant) to the block containing processor cores 1B and 2B, switching element 1063 and memory module 1071. Memory module 1020 can be read by all processors. In the normal mode, the processors 1A and 1B run synchronously with respect to one another, with the result that one processor forms a monitoring mechanism for the other. The processor cores 2A and 2B also correspondingly operate synchronously and monitor each other. Monitoring is effected using comparators which are implemented in modules (comparison units) 1091 and 1090. Comparison unit 1091 monitors all access to redundant memory modules 1021 and 1071, and comparison unit 1090 monitors all access to peripherals. This architecture can be implemented in such a manner that all peripheral modules are redundant. For example, the peripheral modules 1040, 1041, 1048 may be redundant with respect to the peripheral modules 1030, 1031, . . . 1038. In this case, the comparison unit 1090 may only comprise comparators for access to peripherals. For financial reasons, many peripheral modules are often not implemented in a redundant manner. In this case, the comparison unit 1090 will comprise, in addition to peripheral comparators, additional circuits which forward data from non-redundant peripheral modules to the redundant switching elements 1013 and 1063 in a synchronous manner.

Figure 13:
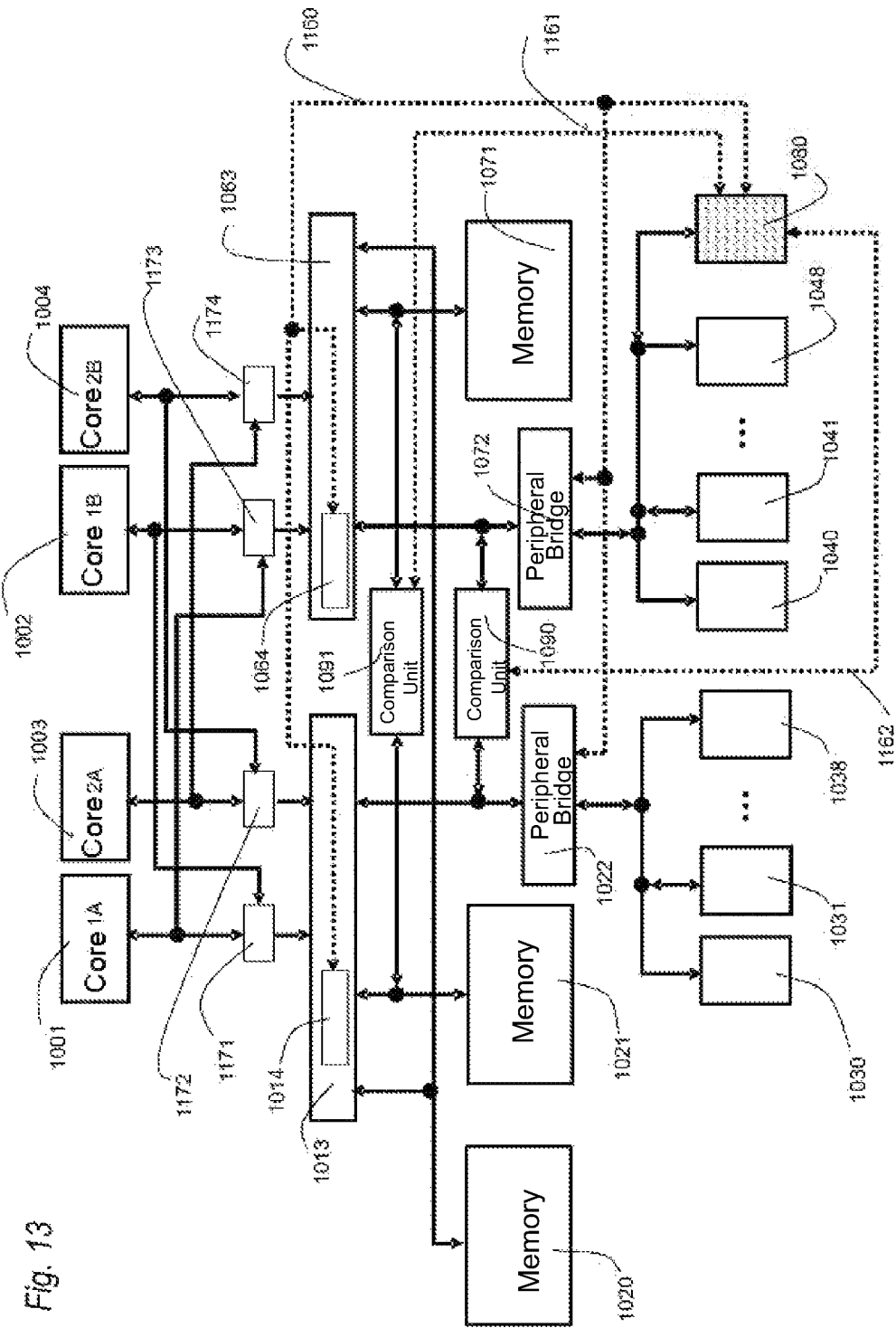
FIG. 13 shows a control computer system according to one embodiment.

FIG. 13 shows another exemplary embodiment of the control computer system according to the invention. In this case, the architecture illustrated in FIG. 12 is expanded in order to support the concepts for ensuring better availability of the electronic regulating algorithms provided by the control computer system, which concepts were explained using FIGS. 10 and 11. Multiplexers 1171, 1172, 1173 and 1174 are positioned between each processor core 1A, 2A, 1B, 2B and the corresponding switching element 1013, 1063, with the result that the respective second core of a processor pair can access data and address buses of the first core of the processor pair and, conversely, the first processor in a pair can also access data and address buses of the second processor. If the processor core 1A fails, multiplexer 1171, for example, ensures that the switching element 1013 is supplied with the data from the redundant processor core 1B. The multiplexers 1171, 1172, 1173 and 1174 are controlled in the SAM module 1080 in which all error signals 1161, 1162 are monitored by the comparators. After a lockstep error has been detected, the SAM module 1080 blocks access to safety-relevant components by forwarding corresponding control signals 1160 to monitoring units 1014 and 1064 in switching elements 1013 and 1014 and to peripheral bridges 1022 and 1072. Restoration of the mode after error analysis is effected, in principle, according to the schemes illustrated in FIGS. 11, 18 and/or 19, with the necessary adaptations if appropriate.

The SAM module 1080 (restoration control unit) configures switching elements 1013, 1063 and multiplexers 1171, 1172, 1173 and 1174 in a suitable manner in order to exclude defective processors or else other components from further accessing the peripherals. This is also effected using other redundantly designed components, for example memory modules. In this case too, the defective memory module is excluded by reconfiguring switching element 1013, 1063 and multiplexer 1171, 1172, 1173 and 1174.

Figure 14:
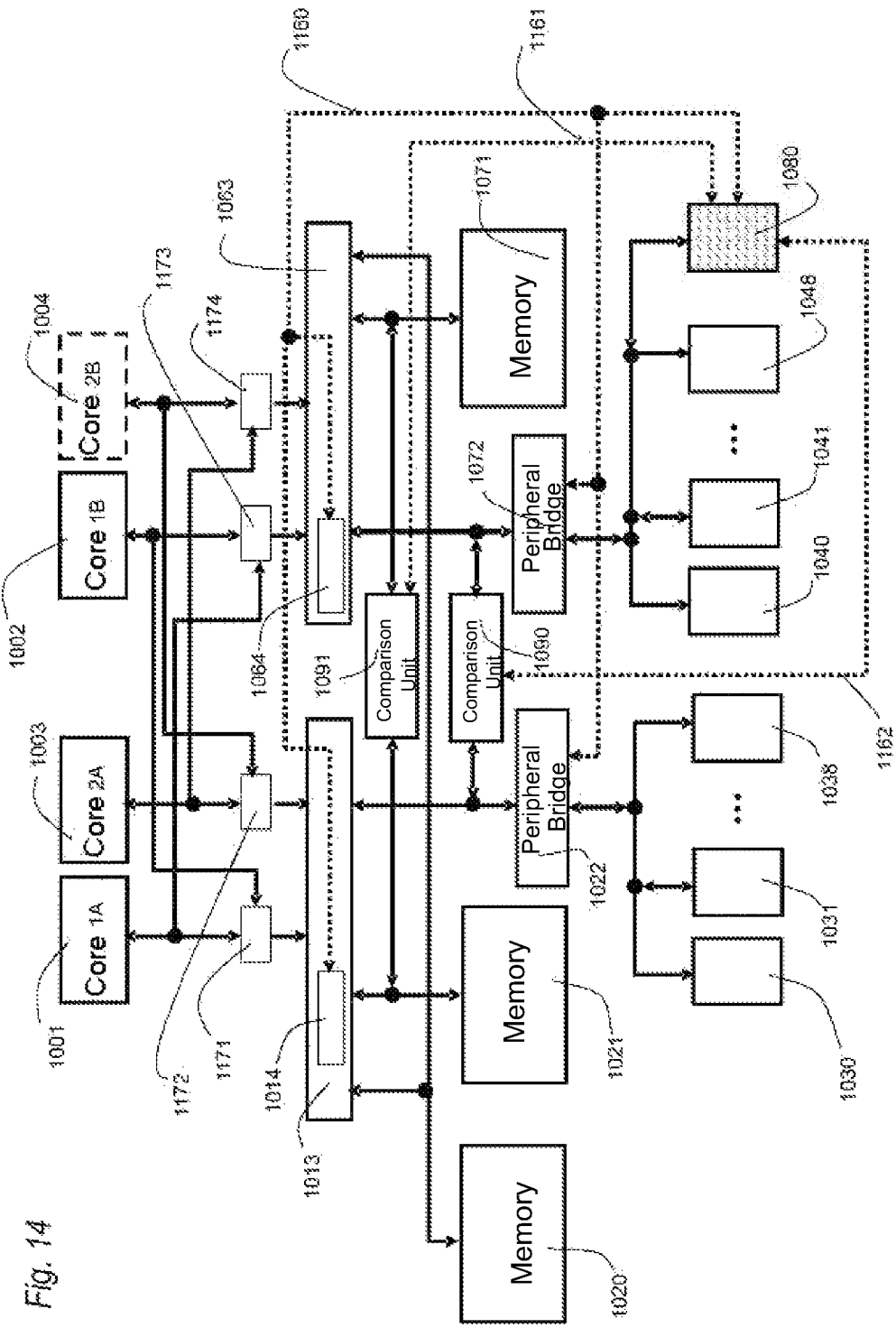
FIG. 14 shows the control computer system according to the invention in the architecture from FIG. 13 with the processor core 2B switched off after restoration.
Figure 15:
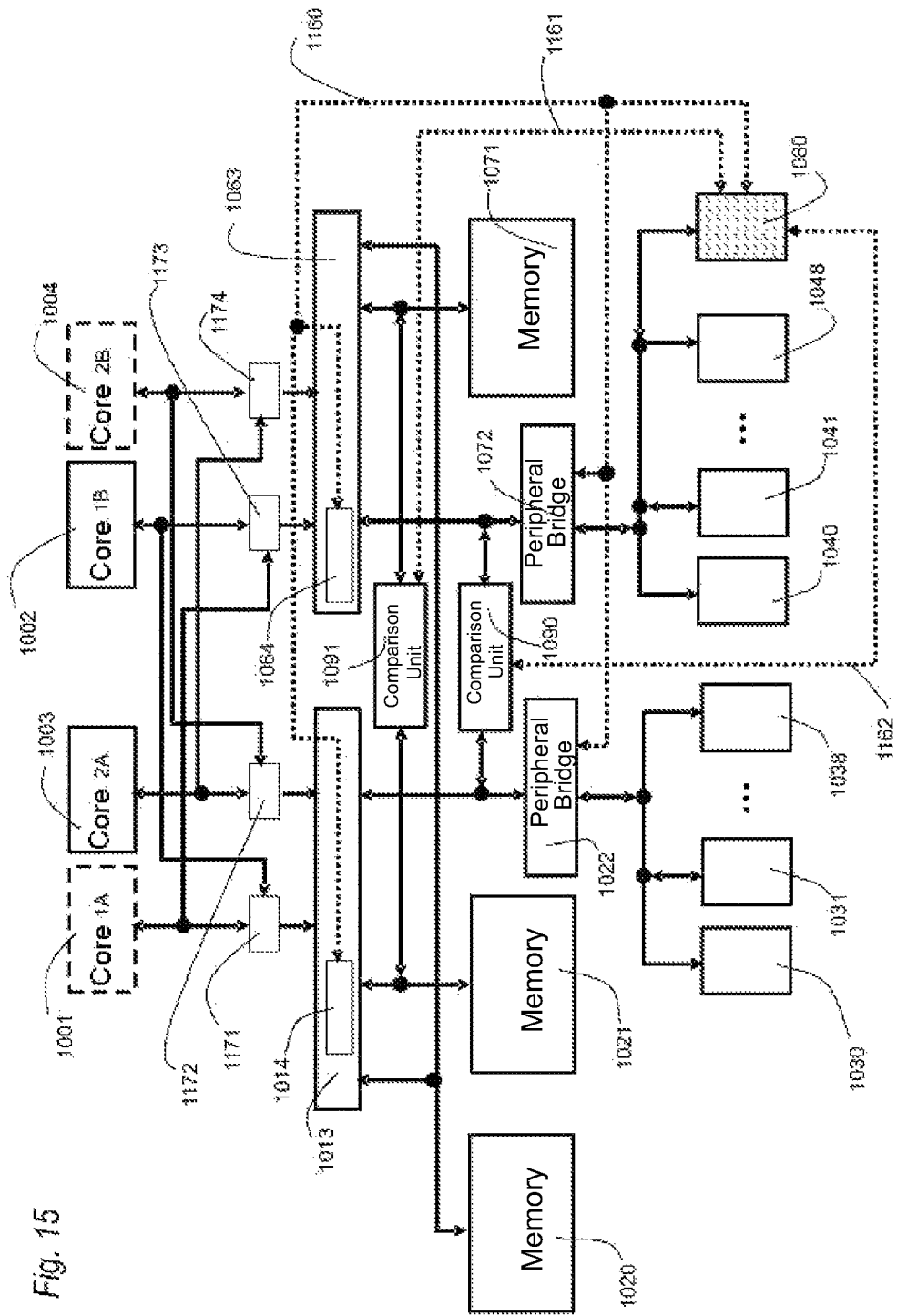
FIG. 15 shows the control computer system according to the invention in the architecture from FIG. 13 with the processor cores 1A and 2B switched off after restoration.
Figure 16:
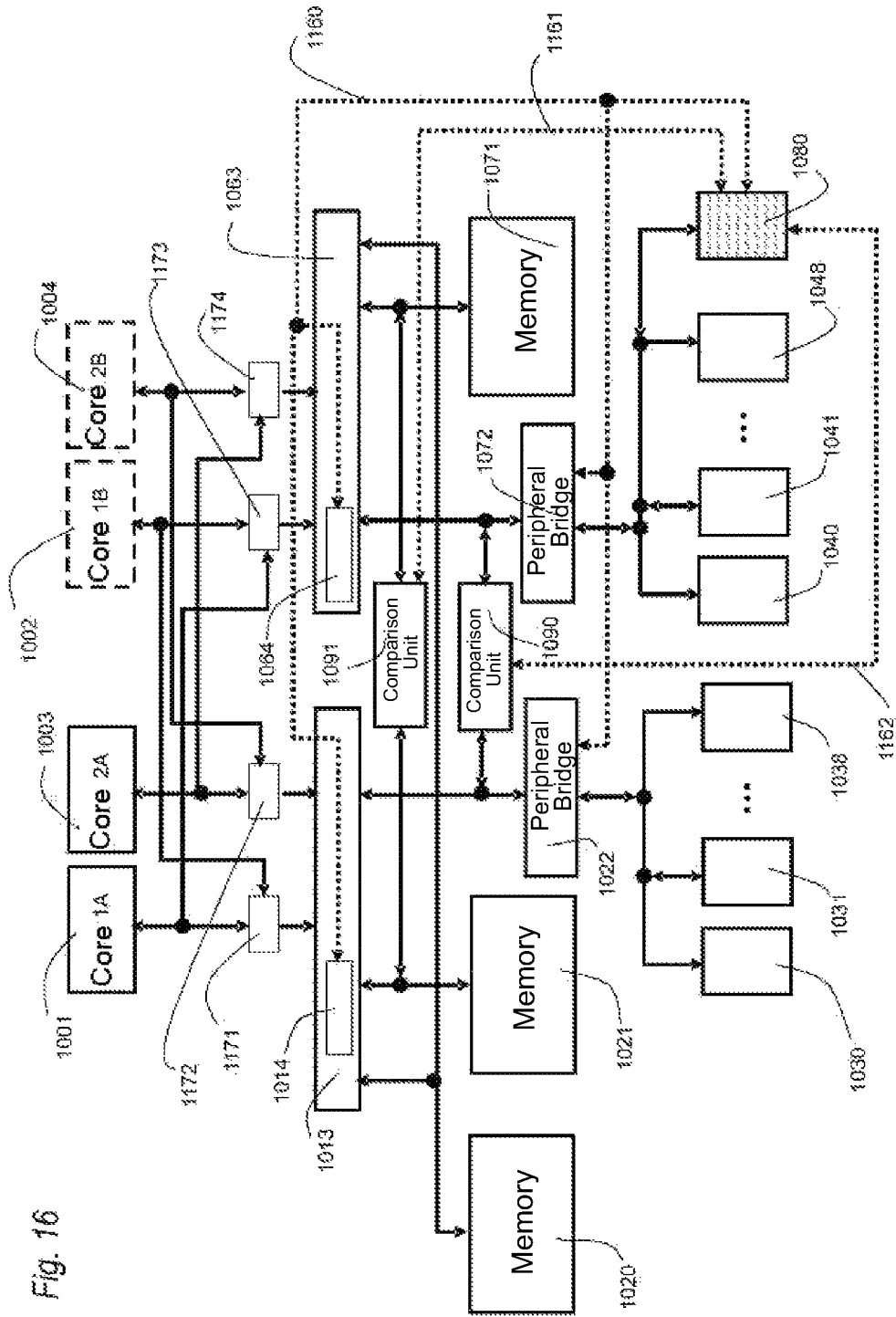
FIG. 16 shows the control computer system according to the invention in the architecture from FIG. 13 with the processor cores 1B and 2B switched off after restoration.

FIGS. 14, 15 and 16 each show the control computer system according to the invention in the architecture from FIG. 13, in which case one or more permanently defective processors have been switched off in each case. The remaining processor core(s) respectively drive(s) the peripherals, in which case the user is warned if necessary and safety-critical functions are preferably performed only on processors which still have a functional monitoring processor, that is to say a complete processor pair still operates. Processors without a monitoring processor preferably perform only non-safety-critical functions. The failed processors (cores) are illustrated using dashed lines.

FIG. 14, for example, shows only the failure of the processor core 2B. The processor cores 1A and 1B are still redundant and execute all safety-critical tasks (obligatory software modules) including those which were originally executed by the processor pair 2A/2B. Processor core 2A may execute non-safety-relevant tasks (optional software modules) including the optional software modules originally executed by the processor pair 1A/1B. All safety-relevant tasks were therefore transferred to the redundant processor pair 1A/1B which still remained. An advantage of this approach is that no additional reserve processor pairs, which do not carry out any function in the normal mode (all processors are error-free), have to be provided for the emergency mode (failure of a processor pair or an individual core of a processor pair). Only the execution of the optional software modules is restricted when an error occurs. However, this is not relevant to safety.

Figure 17:
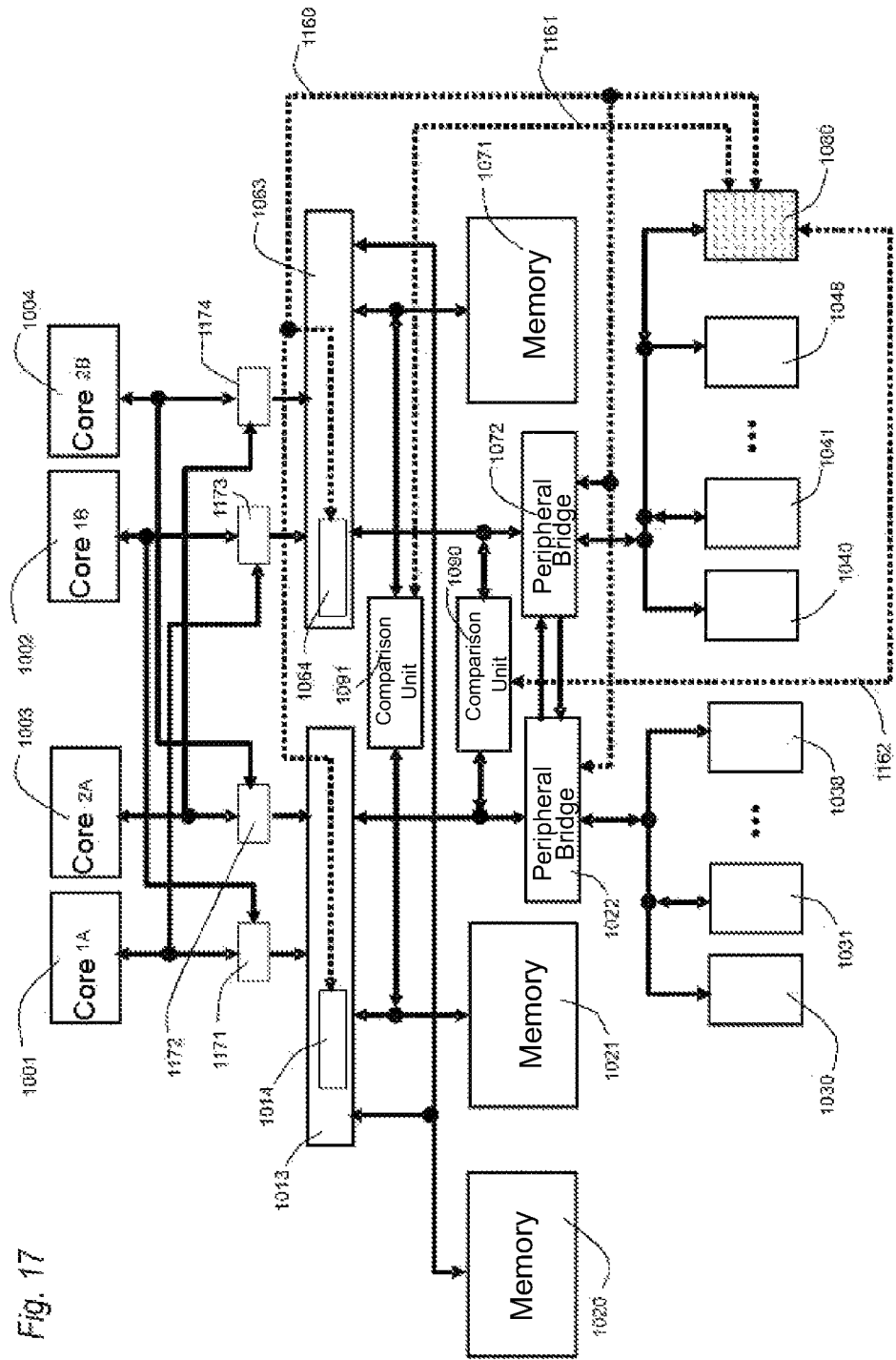
FIG. 17 shows a control computer system according to one embodiment.

FIG. 17 shows a further architecture of a control computer system having processor pairs in extended double redundancy according to one embodiment.

In contrast to the architecture illustrated in FIG. 9, not only processors 1001, 1002, 1003, 1004 but also other components are redundant. For example, the bus matrices (switching elements) 1013 and 1063 and the data memories 1021 and 1071 are redundant. The connections between the peripheral bridges 1022 and 1072 in this embodiment ensure that data are transmitted from non-redundant peripheral components to the redundant pairs 1A/1B and/or 2A/2B of processor cores in a synchronous manner.

The architecture shown in FIG. 17 is expanded by the SAM module 1080 and the switching elements 1171, 1172, 1173 and 1174. Depending on the types of error, the SAM module 1080 will drive the monitoring units 1014 and 1064 inside the bus matrices or switching elements 1013 and 1063 as well as the switching elements 1171, 1172, 1173 and 1174 in order to prohibit the defective processor pair 1A/1B, 2A/2B or only the defective processor 1A, 1B, 2A, 2B from accessing particular peripheral modules and RAM memories. The SAM module 1080 is immediately informed if the comparators in the modules (comparison units) 1090 and 1091 have detected an error. The SAM module 1080 will use the error signals to ensure that the affected processor pair 1A/1B or 2A/2B or the affected processor 1A, 1B, 2A or 2B can no longer drive actuators via peripheral modules. The SAM module 1080 can use control signals 1160 to prevent access to peripheral modules in the bus matrices 1013 and 1063 or in the peripheral bridges 1022 and 1072.

Figure 18:
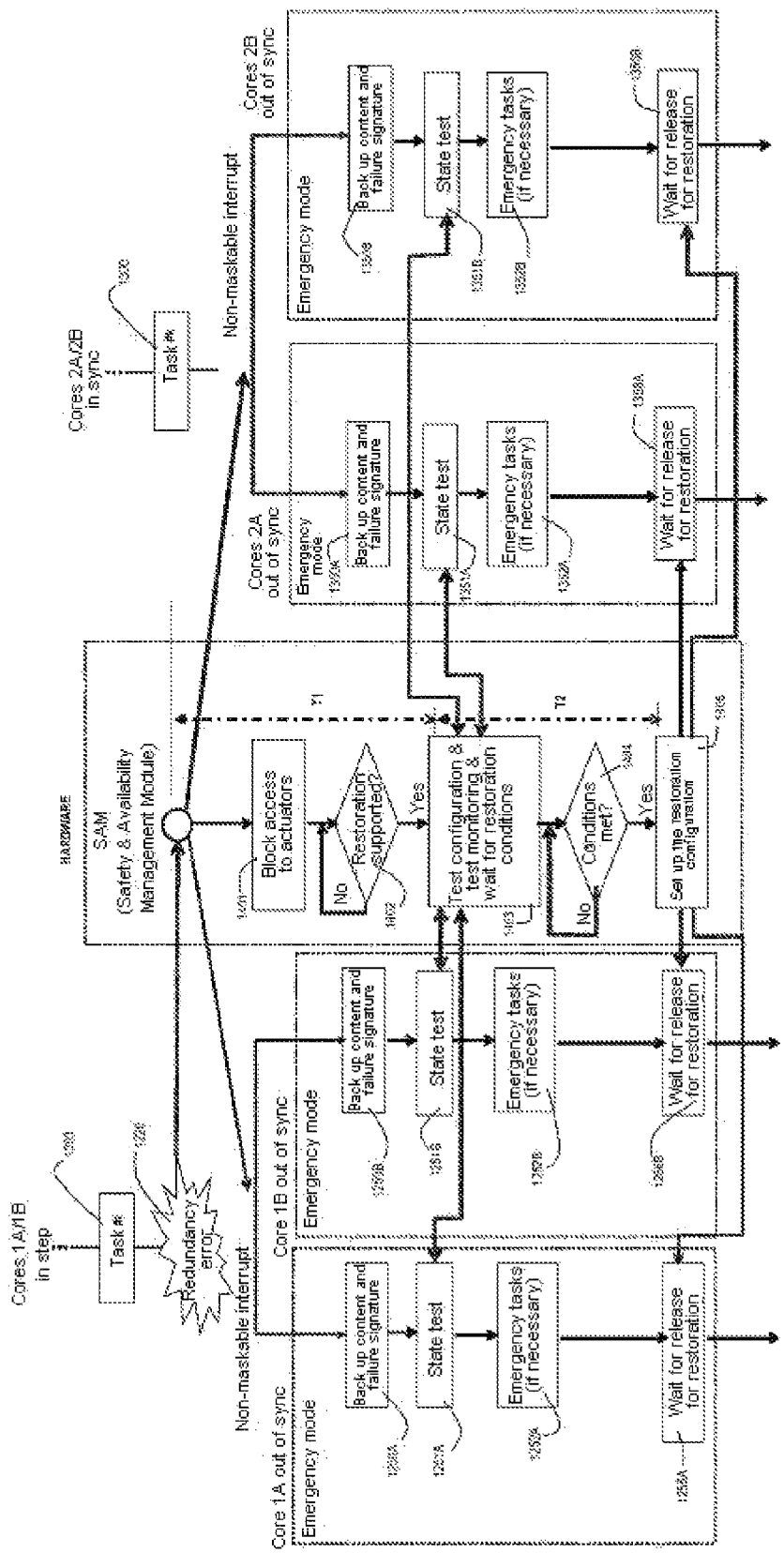
FIG. 18 shows a flowchart for an error-handling method according to one embodiment.

FIG. 18 shows the exemplary illustration of the sequence after an error has been detected according to one embodiment. If the comparator in the modules 1090 and 1091 in FIG. 17 detects an error 1220, an interrupt is triggered for both processor pairs 1A/1B and 2A/2B.

The processors 1A and 1B exit the lockstep mode in step 1200 and jump to the execution of the interrupt routine in an asynchronous manner. The processors 2A and 2B also exit the lockstep mode in step 1300 and jump to the execution of the interrupt routine in an asynchronous manner. Each processor first of all rescues context data or content (1250A, 1250B, 1350A, 1350B) required for the running application. As a sign of a good state, all processors 1A, 1B, 2A, 2B will write a digital signature, which can be detected and checked by the SAM module 1080, to registers of the SAM module 1080 (1250A, 1250B, 1350A, 1350B). If the signature stored by a processor is incorrect or is not present after a predefined time interval T1, the processor is no longer taken into account in the restoration process. In this case, the SAM module 1080 controls all switching elements 1014, 1064, 1171, 1172, 1173 and 1174 in such a manner that any access to memory modules and peripheral modules by the defective processor is blocked. An error pattern is stored in the SAM module 1080 for each type of error. The remaining processors are subjected to further tests in step 1251A, 1251B, 1351A or 1351B. Depending on the error pattern, different tests are carried out in software and/or hardware. Hardware tests, for example in the form of LBIST (Logic Built-in Self Test), are used, in particular, for serious errors and in the case of unclear error assignment. The results of the tests in step 1251A, 1251B, 1351A and 1351B are stored in the SAM module 1080 and are then evaluated after a time interval T2. The SAM module 1080 will use the collected results to decide which processor or processors is/are defective and will accordingly configure the switching elements 1014, 1064, 1171, 1172, 1173 and 1174 in such a manner that only the error-free processors continue to be taken into account in the restoration process. The defective processors are denied access.

The procedure illustrated in FIG. 18 can be expanded in such a manner that a defective component is detected in other redundant modules. The basic idea is to use double redundancy everywhere in an existing architecture in order to be able to ensure improved availability of a safety system. This applies to redundant memories, for example. Suitable tests 1251A, 1251B, 1351A and 1351B can be used by the SAM module 1080 to accurately determine which of two redundant memory modules is defective. Access to the redundant memory modules 1021 or 1071 can be diverted using the configuration of the switching elements 1014, 1064, 1171, 1172, 1173 and 1174 in such a manner that only one memory actually retains and reproduces valid data. The continued procedure can be carried out in a similar manner to that shown in FIG. 11.

The architecture illustrated in FIG. 17 provides a higher degree of freedom of the error tolerance than the architecture shown in FIG. 12 on account of the large number of redundant components.

Figure 19:
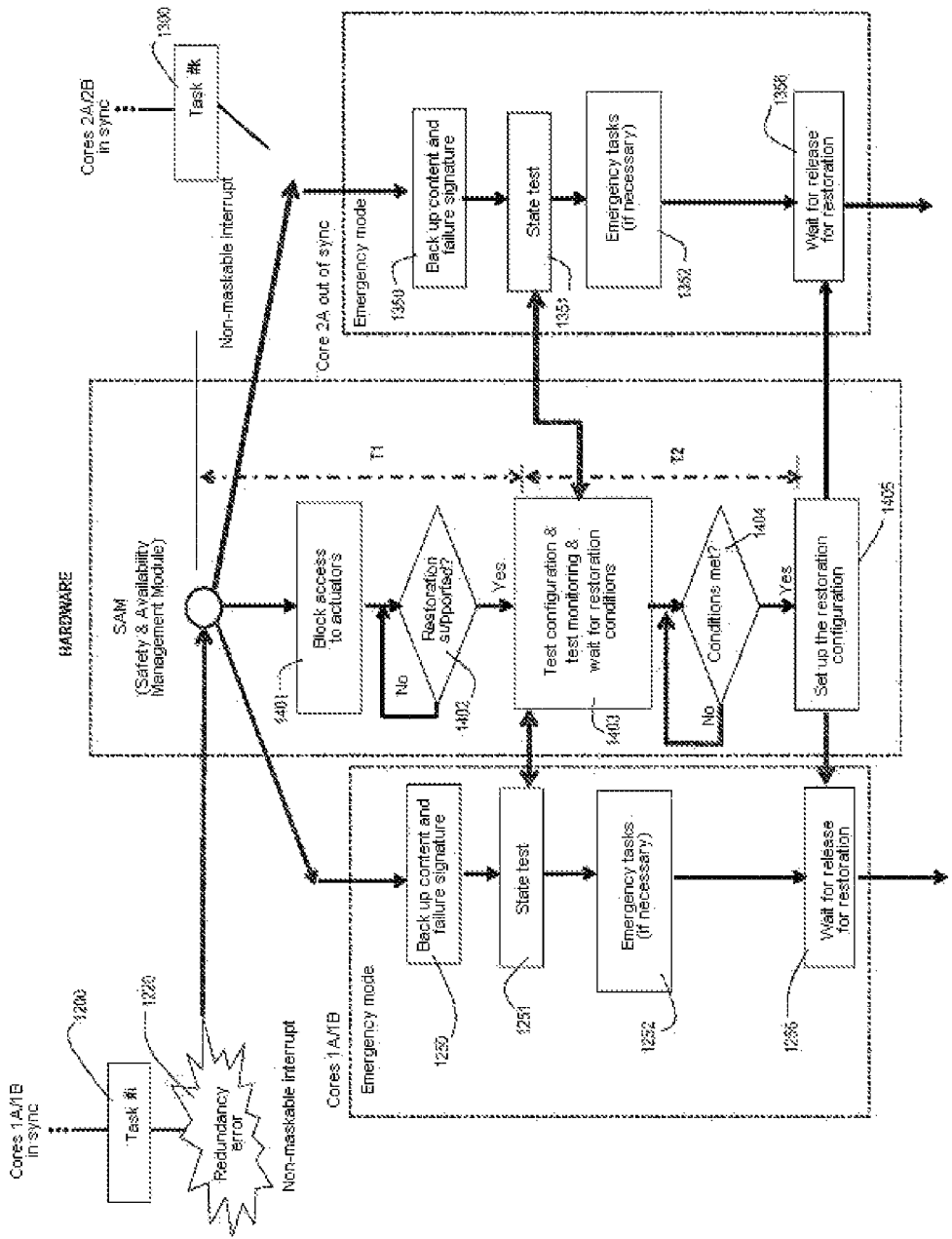
FIG. 19 shows a flowchart for an error-handling method according to one embodiment.

FIG. 19 shows an exemplary illustration of the sequence after an error has been detected according to one embodiment. If the comparator in the module 1011 in FIG. 10 detects an error 1220, an interrupt is triggered for both processor pairs 1A/1B and 2A/2B. The procedure is similar to that in FIG. 18. For the architecture illustrated in FIG. 10, redundant processors in a pair cannot be separated. Therefore, the SAM module 1080 will only determine which processor pair is defective. All data access by the defective processor pair is blocked by appropriately configuring the switching element 1014. For the rest, the execution is effected in a similar manner to that shown in FIG. 11.

Figure 20:
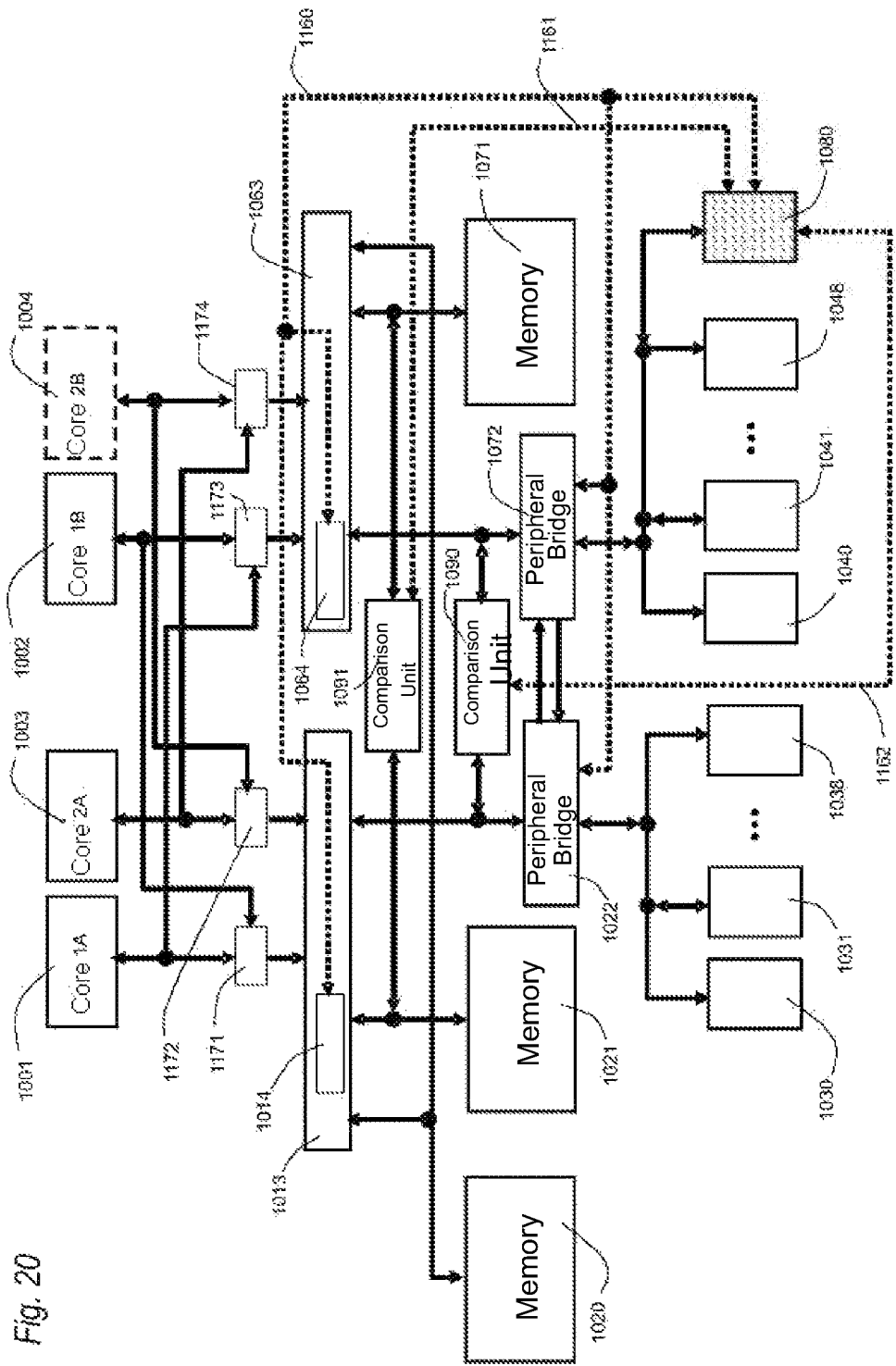
FIG. 20 shows the architecture from FIG. 17 with the processor core 2B switched off after restoration.

FIG. 20 shows the architecture from FIG. 17 with the processor core 2B switched off after restoration.

Figure 21:
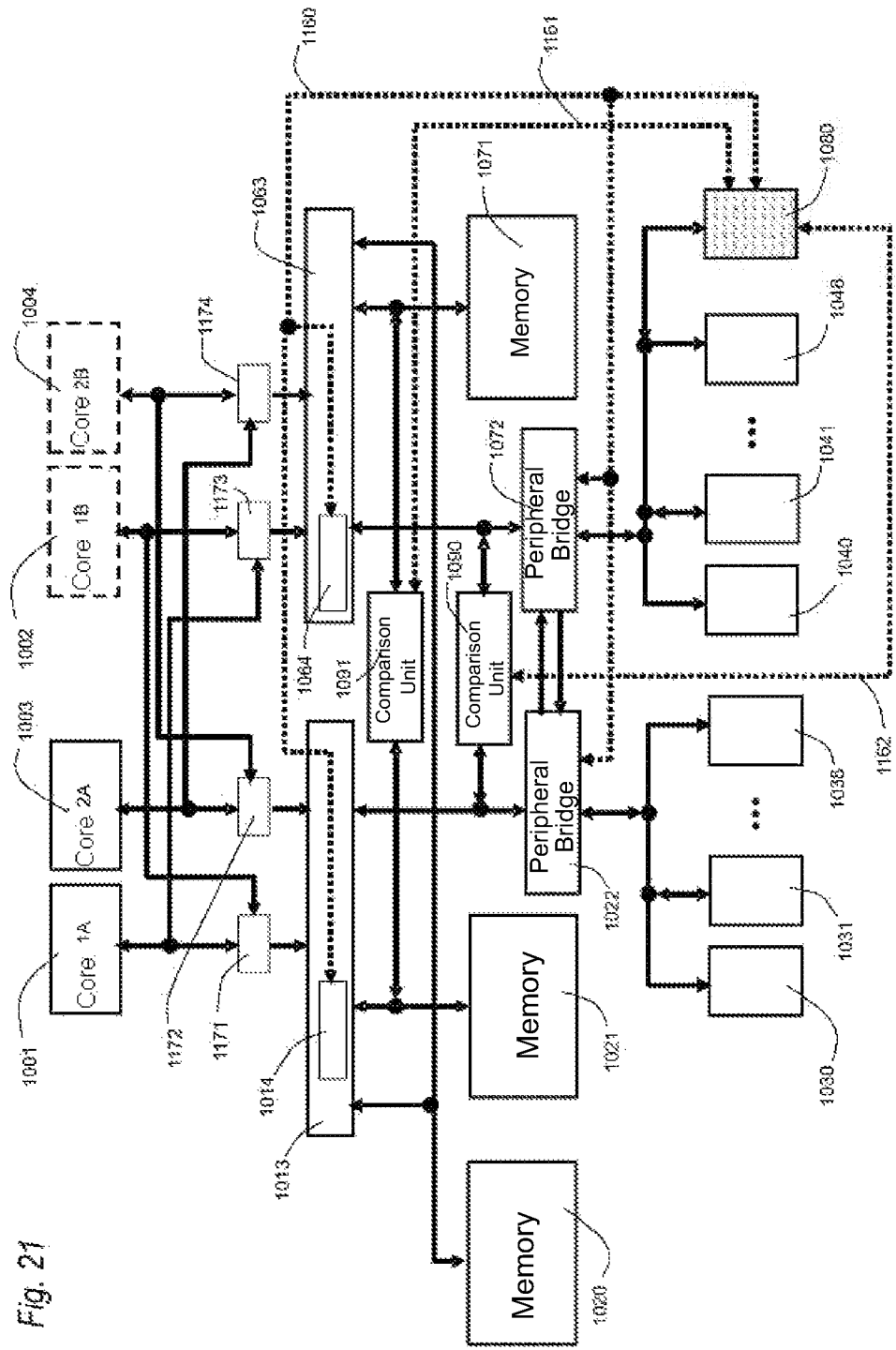
FIG. 21 shows the architecture from FIG. 17 with the processor cores 1B and 2B switched off after restoration.

FIG. 21 shows the architecture from FIG. 17 with the processor cores 1B and 2B switched off after restoration.

Figure 22:
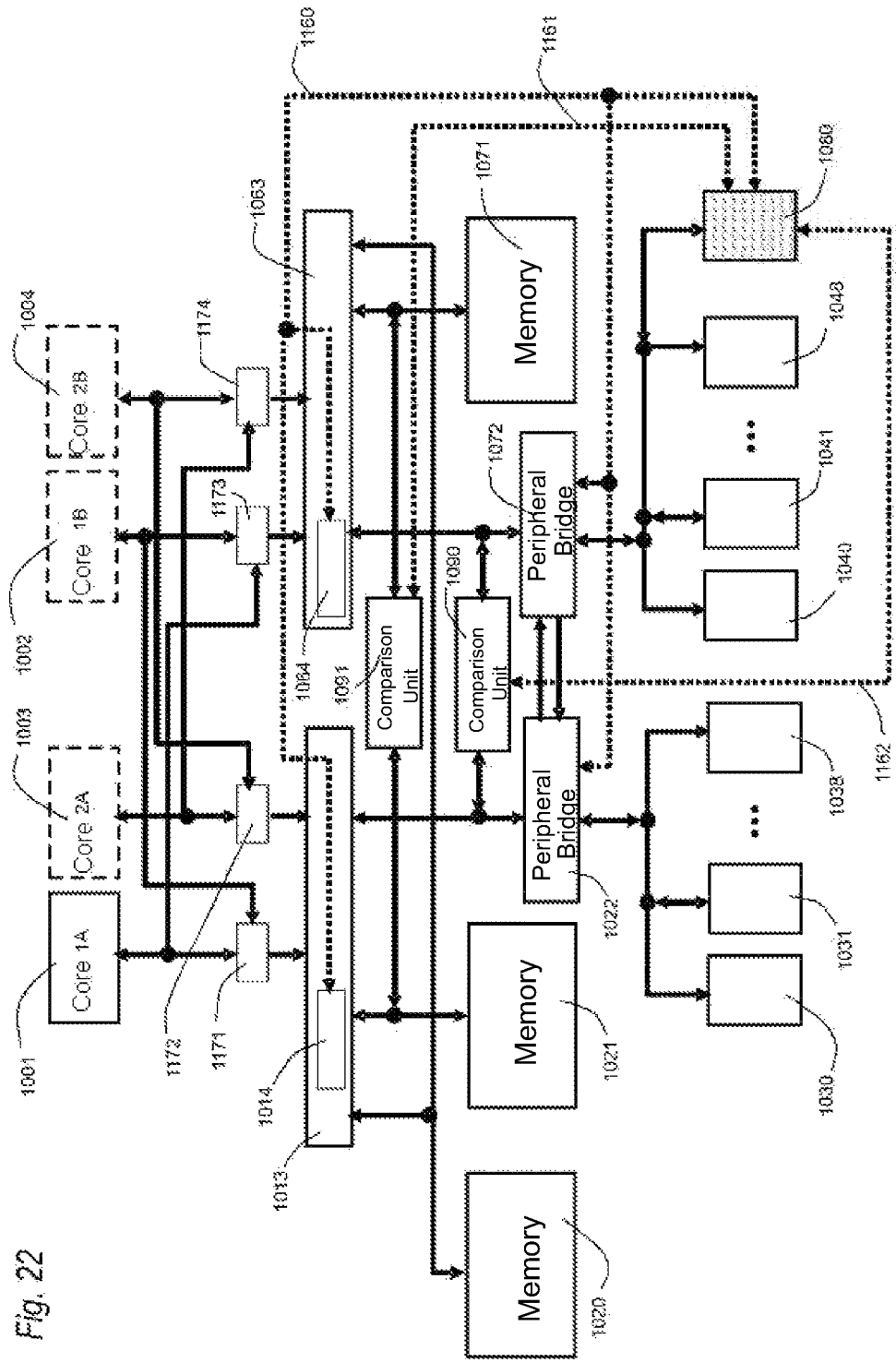
FIG. 22 shows the architecture from FIG. 17 with the processor cores 1A, 2A and 1B switched off after restoration.

FIG. 22 shows the architecture from FIG. 17 with the processor cores 1A, 2A and 1B switched off after restoration. In this case, there is no longer any processor redundancy. However, the test described above, for example in a similar manner to the procedure explained in FIGS. 6, 11, 18 and 19, ensures that all defective processors are correctly detected and are excluded from access to the peripherals.

Figure 23:
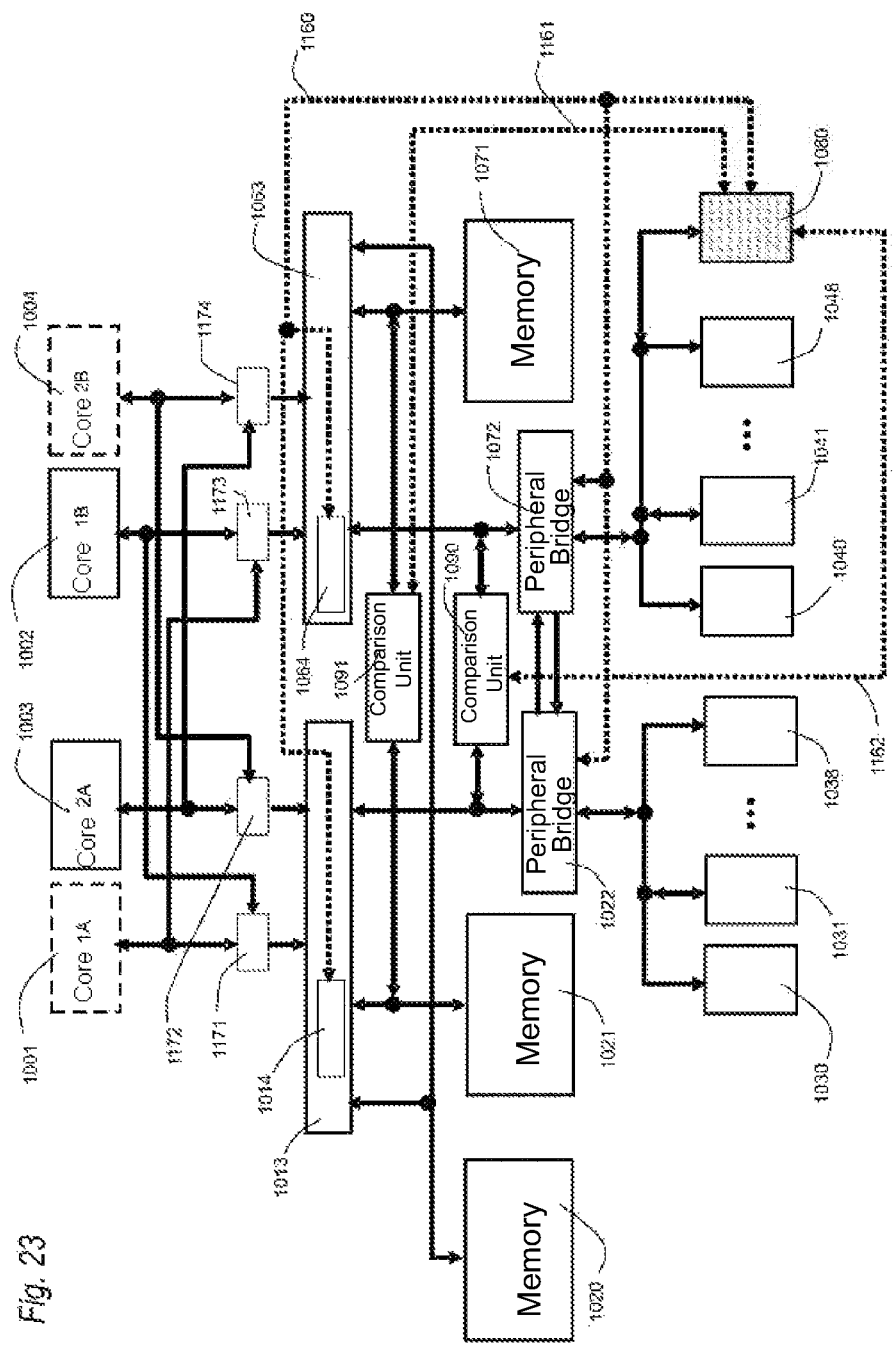
FIG. 23 shows the architecture from FIG. 17 with the processor cores 1A and 2B switched off after restoration.

FIG. 23 shows the architecture from FIG. 17 with the processor cores 1A and 2B switched off after restoration.

Figure 24:
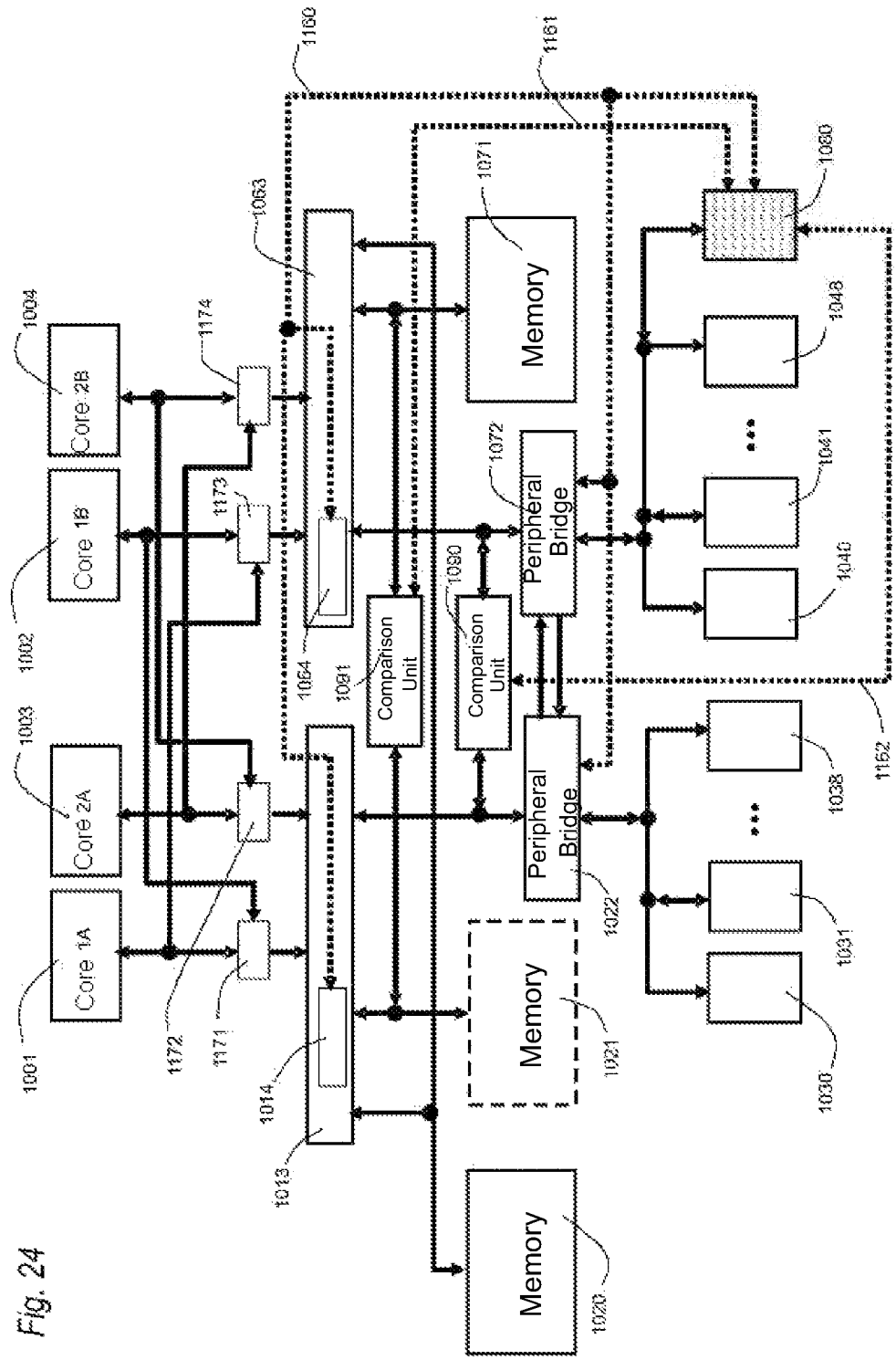
FIG. 24 shows the architecture from FIG. 17 with the data memory 21 switched off after restoration.

FIG. 24 shows the architecture from FIG. 17 with the data memory 21 switched off after restoration. This architecture has data memories 21 and 71 which are redundant per se, in which case, after failure of the memory module 1021, the latter was reliably identified as defective and excluded.

Overall, the control computer system described here provides safety-relevant functions in an improved manner and reliably identifies and excludes defective components.

One embodiment provides a control computer system (control device) comprising at least two processor pairs, at least two comparison units (comparators) for detecting errors, at least one memory, at least one peripheral unit, at least one switching element, for example in the form of a switching matrix, which allows or blocks access to memories and peripheral units by the processors, wherein a preferably common error-handling unit (restoration control unit; SAM module) receives signals from the at least two comparison units and controls the at least one switching matrix in order to completely or selectively prevent access to memories and/or peripheral units by a processor or a processor pair.

According to one embodiment, access to peripheral units, in particular actuators, by the at least one defective processor pair is prevented when an error occurs.

According to one embodiment, peripheral units are accessed each time via a peripheral bridge which is controlled by the error-handling unit (restoration control unit; SAM module).

According to one embodiment, the at least two comparison units are directly connected to the two processors in a processor pair.

According to one embodiment, the comparison unit comprises at least two separate switching matrices, wherein the first switching matrix is connected to a first peripheral bridge and at least one first memory, while the second switching matrix is connected to a second peripheral bridge and at least one second memory.

According to one embodiment, the first processor in a processor pair is connected to a first switching matrix, and the second processor in a processor pair is connected to a second switching matrix.

According to one embodiment, the data transmitted between the first switching matrix and the first memory are compared with the data transmitted between the second switching matrix and the second memory by a comparison unit, wherein the data transmitted between the first switching matrix and the first peripheral bridge are compared with the data transmitted between the second switching matrix and the second peripheral bridge by a comparison unit.

According to one embodiment, a multiplexer is respectively positioned between the processors and switching matrices, wherein the multiplexers are connected in such a manner that the first processor in a processor pair can access the second switching matrix and the second processor in a processor pair can access the first switching matrix as soon as the error-handling unit (restoration unit, SAM module) accordingly controls the multiplexers.

According to one embodiment, at least one switching matrix comprises a monitoring unit which can block access to memories or peripheral units or can log said access in an external or internal, preferably non-volatile, memory.

According to one embodiment, the error-handling unit directly receives signals from the at least two comparison units without an interposed switching matrix.

According to one embodiment, the control computer system comprises a first and a second volatile memory and a non-volatile memory, wherein, in particular, one processor pair accesses the first volatile memory and the second processor pair accesses the second volatile memory and both processor pairs access the one non-volatile memory.

According to one embodiment, the first processor in a processor pair is directly connected to at least one switching matrix, that is to say can have read and write access to memories and/or peripheral units, while the second processor in a processor pair has only read access to data, wherein, in particular, a comparison unit directly connected to both processors in a processor pair transmits data to the second processor in the connected processor pair.

One embodiment provides a method for controlling a control computer system comprising at least two processor pairs, at least two comparison units for detecting errors, at least one switching matrix which allows or blocks access to memories and/or peripherals by a processor or a processor pair, and at least one error-handling unit which can control at least the switching matrix, wherein the method is executed in such a manner that the processor pairs can execute different programs in order to provide functions in the error-free mode and, if an error occurs, the error-free processor pair assumes at least some functions of the defective processor pair.

According to one embodiment, functions critical to the safety of the apparatus driven by the control computer are executed independently of the occurrence of an error.

According to one embodiment, non-safety-critical functions are at least partially no longer provided when an error occurs.

According to one embodiment, access to peripherals by the defective processor or processor pair is blocked when an error occurs.

According to one embodiment, the defective processor pair executes a diagnostic program after an error has occurred.

According to one embodiment, errors which have occurred are classified, wherein a distinction is made at least between transient errors and permanent errors.

According to one embodiment, the defective processor pair is permanently deactivated after a permanent error has occurred.

According to one embodiment, both processor pairs can execute different programs again when the defective processor pair has run through the diagnostic program without a permanent error being detected.

According to one embodiment, the error-handling unit logs the occurrence of errors in a non-volatile memory.

According to one embodiment, a processor pair is permanently deactivated if the number and/or frequency of errors which have occurred exceed(s) a predefined threshold value.

According to one embodiment, one of the control computer systems described above can be used in a motor vehicle, in particular in order to control or regulate a brake system.

The invention is not restricted to the exemplary embodiments described in the present case but rather can be suitably expanded and modified. The following claims are a first, non-binding attempt to generally define the invention.

The invention claimed is:

1. A control computer system comprising:
at least two processor pairs, each processing pair comprising at least two processors or cores which are designed to be redundant with respect to one another;
at least two comparison units for monitoring the synchronization state of the at least two processors or cores of each processor pair and for detecting a synchronization error;
at least one peripheral unit;
at least one switching matrix which is set up to allow or block access to the at least two processors or cores of each processor pair or access to the at least one peripheral unit by the at least two processors or cores of each processor pair;
an error-handling unit which is set up to receive signals from the two comparison units and to drive the switching matrix in order to completely or selectively prevent access to memories or the at least one peripheral unit by a processor or core or a processor pair; and
in an error-free mode the processor pairs are configured to execute different programs and if an error occurs, an error-free processor pair assumes some tasks of a failed processor pair.

2. The control computer system as claimed in claim 1, further comprising the modules in the form of at least four processor units.

3. The control computer system as claimed in claim 1, wherein, when an error occurs, the error-handling unit is set up to drive the switching matrix in such a manner that access to the at least one peripheral unit, in the form of actuators, by the one processor pair which is defective or one processor unit which is defective is prevented.

4. The control computer system as claimed in claim 1, wherein the at least one peripheral unit is accessed each time via at least one peripheral bridge which is controlled by the error-handling unit.

5. The control computer system as claimed in claim 4, wherein at least two comparison units are directly connected to the processor units.

6. The control computer system as claimed in claim 1, wherein the control computer system comprises at least a first and a second separate switching matrices, wherein the first switching matrix is connected to a first peripheral bridge and at least one first memory, while the second switching matrix is connected to a second peripheral bridge and at least one second memory.

7. The control computer system as claimed in claim 6, wherein a first processor in a processor pair is connected to the first switching matrix, and a second processor in a processor pair is connected to the second switching matrix.

8. The control computer system as claimed in claim 7, wherein data transmitted between the first switching matrix and the first memory are compared with data transmitted between the second switching matrix and the second memory by the comparison unit, and data transmitted between the first switching matrix and the first peripheral bridge are compared with data transmitted between the second switching matrix and the second peripheral bridge by the comparison unit.

9. The control computer system as claimed in claim 7, wherein a multiplexer is respectively positioned between processors in processor pairs and the switching matrices, wherein multiplexers are connected in such a manner that the first processor in a processor pair can access the second switching matrix and the second processor in a processor pair can access the first switching matrix as soon as a restoration unit accordingly controls the multiplexers.

10. The control computer system as claimed in claim 1, wherein the at least one switching matrix comprises a monitoring unit which is set up to block access to the memory or the at least one peripheral unit or to log the access in an external or internal, non-volatile, memory.

11. The control computer system as claimed in claim 1, wherein the error-handling unit directly receives signals from comparison units without an interposed switching matrix.

12. The control computer system as claimed in claim 1, wherein the control computer system further comprises a first and a second volatile memory and a non-volatile memory, wherein, a first pair of processors accesses the first volatile memory and a second pair of processors accesses the second volatile memory and both the processor pairs access the one non-volatile memory.

13. The control computer system as claimed in claim 1, wherein one of first processor in a pair of processors is directly connected to the switching matrix, having read and write access to the memory or the at least one peripheral unit, while a second processor in the pair of processors having only read access to data, wherein the comparison unit directly connected to both the first and second processors in a processor pair transmits data to the second processor in the connected processor pair.

14. The control computer system as claimed in claim 1, wherein the error-handling unit is a restoration control unit which is set up to monitor the execution of at least one test program by the two or more processor units or the two modules after a synchronization error has occurred and to assess the test results and is also set up to configure at least one first multiplexer or the switching matrix.

15. The control computer system as claimed in claim 14, wherein the restoration control unit is set up to assign the synchronization error to an error type and to select a test program on the basis of the error type.

16. The control computer system as claimed in claim 14, wherein the restoration control unit is set up to configure the first multiplexer on the basis of the test result.

17. The control computer system as claimed in claim 1, wherein a first of the at least one peripheral units is a common unit which can be optionally driven by a first of the two processor units, at least two further peripheral units, wherein one of the two further peripheral units is assigned only to the first of the processor units and the other of the two further peripheral units is assigned only to a second of the processor units as a private peripheral unit which can be accessed only by the respectively assigned processor.

18. The control computer system as claimed in claim 17, wherein the two further peripheral units are redundant units.

19. A method for controlling a control computer system comprising at least two processor pairs, at least two comparison units for detecting errors, at least one switching matrix which allows or blocks access to memories or at least one peripheral unit by the processor pairs, and at least one error-handling unit which can control at least the switching matrix, wherein the processor pairs can execute different programs in order to provide functions in an error-free mode and, if an error occurs, an error-free processor pair assumes at least some functions of a processor pair which is defective.

20. The method as claimed in claim 19, wherein functions critical to the safety of an apparatus driven by the control computer system are executed independently of the occurrence of the error.

21. The method as claimed in claim 19, wherein non-safety-critical functions are at least partially no longer provided when the error occurs.

22. The method as claimed in claim 19, wherein access to the peripheral unit by a processor or processor pair which is defective is blocked when the error occurs.

23. The method as claimed in claim 19, wherein the processor pair which is defective executes a diagnostic program after an error has occurred.

24. The method as claimed in claim 23, wherein the errors which have occurred are classified, wherein a distinction is made at least between transient errors and permanent errors.

25. The method as claimed in claim 24, wherein the defective processor pair which is defective is permanently deactivated after a permanent error has occurred.

26. The method as claimed in claim 24, wherein both the processor pairs can execute different programs again when the defective processor pair which is defective has run through a diagnostic program without a permanent error being detected.

27. The method as claimed in claim 19, wherein the error-handling unit logs the occurrence of the errors in a non-volatile memory.

28. The method as claimed in claim 27, wherein a processor pair is permanently deactivated if the number or frequency of the errors which have occurred exceed a predefined threshold value.

29. A method for controlling a control computer system, comprising:
  providing a control system having:
    at least two processor pairs each with at least two processors;
    at least one comparison unit for detecting errors and for monitoring the synchronization of the processors) in each processor pair;
    at least one switching matrix which allows or blocks access to memories or one or more peripheral units by the processors in the processor pairs;
    at least one error-handling unit for driving the switching matrix;
  synchronously executing at least one first safety-relevant software program on one of the processor pairs and synchronously executing at least one second safety-relevant software program on the other of the processor pairs in order to drive the one or more peripheral units or a memory;
  monitoring the synchronization of the processors in each of the processor pairs by means of the comparison unit and outputting a synchronization error signal by means of the comparison unit when the two processors in one of the processor pairs are desynchronized;
    if a synchronization error signal has been output, interrupting the execution of the first safety-relevant software program and the second safety-relevant software program by the processor pairs, carrying out a test in order to check whether one of the two processor pairs is defective; and
    if one of the two processor pairs is defective, executing the first safety-relevant software program and the second safety-relevant software program on the error-free processor pair and driving the switching matrix by means of the error-handling unit in order to block access to the memories or one or more peripheral units by the defective processor pair or a processor if only one processor in this processor pair is defective.

30. The method as claimed in claim 29, wherein the test comprises the simultaneous execution of at least one test program by both the processor pairs, wherein a processor in the processor pairs is considered to be defective when at least one of the following conditions is met:
  the processor has not executed the test program within a first period of time T1, or
  the processor has not successfully executed the test program, or
  the processor has not changed to a quiescent state for a second period of time T2 after the first period of time T1 has elapsed.

31. The method as claimed in claim 29, wherein the synchronization error is assessed and is assigned to an error type, wherein at least one test program is selected on the basis of the error type in order to check the processors.

* * * * *